US008425049B2

(12) United States Patent
Hirata et al.

(10) Patent No.: US 8,425,049 B2
(45) Date of Patent: Apr. 23, 2013

(54) OBLIQUE PROJECTION OPTICAL SYSTEM AND PROJECTION TYPE DISPLAY APPARATUS USING THE SAME

(75) Inventors: Koji Hirata, Yokohama (JP); Masahiko Yatsu, Fujisawa (JP); Naoyuki Ogura, Machida (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 481 days.

(21) Appl. No.: 12/636,951

(22) Filed: Dec. 14, 2009

(65) Prior Publication Data
US 2010/0171937 A1 Jul. 8, 2010

(30) Foreign Application Priority Data

Jan. 8, 2009 (JP) ................................ 2009-002124
Aug. 28, 2009 (JP) ................................ 2009-197587

(51) Int. Cl.
G03B 21/22 (2006.01)
(52) U.S. Cl.
USPC .................................. 353/70; 353/50; 353/77
(58) Field of Classification Search .................... 353/46, 353/50, 69, 70, 77, 100; 359/720, 846, 850
See application file for complete search history.

(56) References Cited

U.S. PATENT DOCUMENTS

| 6,652,104 B2 | 11/2003 | Nishida et al. | |
| 7,342,724 B2 | 3/2008 | Hirata et al. | |
| 7,670,008 B2 * | 3/2010 | Kuwa | 353/78 |
| 2002/0044263 A1 * | 4/2002 | Takeuchi | 353/69 |
| 2003/0137744 A1 | 7/2003 | Kuwa et al. | |
| 2007/0014027 A1 | 1/2007 | Agatsuma et al. | |

FOREIGN PATENT DOCUMENTS

| JP | 2002-262198 A | 9/2002 |
| JP | 2002-350774 | 12/2002 |
| JP | 2005-157152 A | 6/2005 |
| JP | 2006-259252 | 9/2006 |
| JP | 2006-259252 A | 9/2006 |
| JP | 2008-250296 | 10/2008 |
| WO | WO 2007/050169 A1 | 5/2007 |
| WO | WO 2008/029657 A1 | 3/2008 |

OTHER PUBLICATIONS

Japanese Office Action issued in Japanese Patent Application No. 2009-002124, dated Nov. 15, 2011.
European Search Report issued in European Patent Application No. 09252803.3-2209/2209024, dated Aug. 4, 2010.

* cited by examiner

Primary Examiner — Kevin Pyo
(74) Attorney, Agent, or Firm — McDermott Will & Emery LLP

(57) ABSTRACT

A projection type display apparatus including an oblique projection optical system having a plurality of lenses is disclosed. A lens nearest to a projection screen has a vertical effective image area through which a light flux passes. The lens is arranged at a position not including an optical axis shared by the largest number of lenses among the plurality of lenses. A flat mirror for returning the optical path is arranged between the particular lens and the projection screen at a predetermined angle to the optical axis. An enlarged image obtained by the light flux returned by the flat mirror is formed toward a display screen.

10 Claims, 23 Drawing Sheets

1017 LENS DATA

1024 LENS DATA (A) SLOW SLIDE SERVO MACHINING (B) FLY MACHINING

FIG. 25A

| NAME | SURFACE NO. | SHAPE | CURVATURE RADIUS | INTER-SURFACE DISTANCE | REFRACTIVE INDEX/ABBE NUMBER | EFFECTIVE DIA. (RADIUS) |
|---|---|---|---|---|---|---|
| OBJECT SURFACE | (0) | SPHERIC | ∞ | 3000 | | |
| INCIDENCE PUPIL | (1) | SPHERIC | ∞ | −3000 | | |
| | (2) | SPHERIC | ∞ | 5.977 | | |
| CONVERSION FILTER | (3) | SPHERIC | ∞ | 26.395 | 1.5168 / 64.20 | |
| | (4) | SPHERIC | ∞ | 2.9000 | | |
| L1 | (5) | SPHERIC | 33.3860 | 6.08 | 1.8467 / 23.78 | 17.22 |
| | (6) | SPHERIC | 291.769 | 0.200 | | 16.9 |
| L2 | (7) | SPHERIC | 34.059 | 5.840 | 1.8467 / 23.78 | 15.86 |
| | (8) | SPHERIC | −726.066 | 3.023 | | 15.2 |
| L3 | (9) | ASPHERIC | 154.0648 | 4.000 | 1.5251 / 56.46 | 12.8 |
| | (10) | ASPHERIC | 236.3251 | 0.200 | | 11.46 |
| L4 | (11) | SPHERIC | 44.6633 | 5.428 | 1.4875 / 70.44 | 9.82 |
| L5 | (12) | SPHERIC | −16.5979 | 2.000 | 1.8467 / 23.78 | 8.66 |
| L6 | (13) | SPHERIC | 18.1922 | 3.828 | 1.4875 / 70.44 | 7.2 |
| | (14) | SPHERIC | −21.9158 | 0.2 | | 6.96 |
| L7 | (15) | SPHERIC | −195.1310 | 2 | 1.8467 / 23.78 | 6.35 |
| L8 | (16) | SPHERIC | 15.8472 | 2.28 | 1.4875 / 70.44 | 5.76 |
| | (17) | SPHERIC | −130.2177 | 0.282 | | 5.74 |
| APERTURE DIAPHRAGM | (18) | SPHERIC | ∞ | 28.525 | | 5.7669 |
| L9 | (19) | SPHERIC | −56.4261 | 9.972 | 1.58144 / 40.89 | 21.4 |
| | (20) | SPHERIC | −27.7268 | 0.200 | | 22.4 |
| L10 | (21) | SPHERIC | 97.3236 | 14.498 | 1.64769 / 33.84 | 26 |
| | (22) | SPHERIC | −78.9271 | 2.764 | | 26.18 |
| L11 | (23) | ASPHERIC | 17912.7756 | 6 | 1.4909 / 58.03 | 25.67 |
| | (24) | ASPHERIC | 104.9443 | 9.505 | | 26.2 |
| L12 | (25) | SPHERIC | 48.9383 | 8.508 | 1.8467 / 23.78 | 24.15 |
| | (26) | SPHERIC | 1165.9755 | 2.677 | | 23.4 |
| L13 | (27) | SPHERIC | −113.337 | 2 | 1.74400 / 44.90 | 23.4 |
| | (28) | SPHERIC | 36.138 | 13.754 | | 21.08 |
| L14 | (29) | SPHERIC | −35.4445 | 2.000 | 1.80420 / 46.50 | 21.08 |
| | (30) | SPHERIC | −150.6840 | 16.133 | | 24 |
| L15 | (31) | SPHERIC | −27.5039 | 2 | 1.80420 / 46.50 | 25.28 |
| | (32) | SPHERIC | −121.761 | 17.105 | | 39.25 |
| L16 | (33) | ASPHERIC | −53.0389 | 7 | 1.4909 / 58.03 | 46.800 |
| | (34) | ASPHERIC | −630.8458 | 885.600 | | 52.500 |
| IMAGE SURFACE | (35) | SPHERIC | ∞ | 0 | | |

FIG. 25B $$Z = \frac{c \cdot h^2}{1+\sqrt{1-(1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20}$$

—(EQUATION 1)

| | SURFACE 9 | SURFACE 10 | SURFACE 23 | SURFACE 24 | SURFACE 33 | SURFACE 34 |
|---|---|---|---|---|---|---|
| 1/c | 154.0648 | 236.3251 | 17912.7756 | 104.9443 | −53.0389 | −630.8458 |
| K | 0 | 0 | 0 | 0 | 0 | 0 |
| A | −5.53275E−05 | −4.26343E−05 | −1.68081E−05 | −1.98695E−05 | −2.64101E−06 | −5.60554E−06 |
| B | −4.25424E−08 | −1.06576E−07 | 9.47872E−09 | 1.41385E−08 | 1.48254E−09 | 3.69316E−09 |
| C | 1.11533E−09 | 1.87854E−09 | 7.98423E−12 | 3.40829E−13 | 1.44383E−13 | −2.15871E−12 |
| D | −3.38000E−12 | −1.00894E−11 | −2.48775E−14 | −1.67995E−14 | −6.01192E−17 | 6.07712E−16 |
| E | −2.00200E−14 | −9.92516E−14 | 1.04594E−17 | 1.26685E−17 | 2.83203E−20 | 3.61378E−20 |
| F | 9.26988E−17 | 6.77746E−16 | 4.44289E−20 | 2.13486E−20 | 1.19401E−23 | −6.39771E−23 |
| G | 6.66549E−19 | 5.91739E−18 | −5.19672E−23 | −2.38992E−23 | −5.17162E−27 | −3.48383E−27 |
| H | −5.04272E−21 | −6.45314E−20 | −1.31093E−26 | −1.88830E−26 | −4.83548E−30 | 9.34649E−30 |
| J | 7.90195E−24 | 1.60725E−22 | 2.74980E−29 | 2.19071E−29 | 1.71219E−33 | −1.75388E−33 |

| INTER-SURFACE DISTANCE | | 60 INCH | 80 INCH | 100 INCH |
|---|---|---|---|---|
| | SURFACE S30 | 16.697 | 16.133 | 15.778 |
| | SURFACE S34 | 650.146 | 885.600 | 1121.190 |

| | | 60 INCH | 80 INCH | 100 INCH |
|---|---|---|---|---|
| Y | s35 | 607.3 | 809.5 | 1011.7 |

FIG. 26A

| NAME | SURFACE NO. | SHAPE | CURVATURE RADIUS | INTER-SURFACE DISTANCE | REFRACTIVE INDEX/ABBE NUMBER | EFFECTIVE DIA. (RADIUS) |
|---|---|---|---|---|---|---|
| OBJECT SURFACE | (0) | SPHERIC | ∞ | 3000 | | |
| INCIDENCE PUPIL | (1) | SPHERIC | ∞ | -3000 | | |
| | (2) | SPHERIC | ∞ | 5.977 | | |
| CONVERSION FILTER | (3) | SPHERIC | ∞ | 26.395 | 1.5168 / 64.20 | |
| | (4) | SPHERIC | ∞ | 2.9000 | | |
| L1 | (5) | SPHERIC | 33.6265 | 6.08 | 1.8467 / 23.78 | 17.22 |
| | (6) | SPHERIC | 459.090 | 0.200 | | 16.9 |
| L2 | (7) | SPHERIC | 35.276 | 5.840 | 1.8467 / 23.78 | 15.86 |
| | (8) | SPHERIC | -762.637 | 2.748 | | 15.2 |
| L3 | (9) | ASPHERIC | 113.8712 | 4.000 | 1.5251 / 56.46 | 12.8 |
| | (10) | ASPHERIC | 144.7708 | 0.200 | | 11.46 |
| L4 | (11) | SPHERIC | 42.4070 | 5.445 | 1.4875 / 70.44 | 9.82 |
| L5 | (12) | SPHERIC | -16.8973 | 2.000 | 1.8467 / 23.78 | 8.66 |
| L6 | (13) | SPHERIC | 17.6921 | 3.836 | 1.4875 / 70.44 | 7.2 |
| | (14) | SPHERIC | -22.2863 | 0.2 | | 6.96 |
| L7 | (15) | SPHERIC | -304.9558 | 2 | 1.8467 / 23.78 | 6.35 |
| L8 | (16) | SPHERIC | 15.7526 | 2.28 | 1.4875 / 70.44 | 5.76 |
| | (17) | SPHERIC | -198.2998 | 0.428 | | 5.74 |
| APERTURE DIAPHRAGM | (18) | SPHERIC | ∞ | 27.962 | | 5.7414 |
| L9 | (19) | SPHERIC | -58.5302 | 9.933 | 1.58144 / 40.89 | 21.4 |
| | (20) | SPHERIC | -27.7544 | 0.200 | | 22.4 |
| L10 | (21) | SPHERIC | 105.2986 | 15.322 | 1.64769 / 33.84 | 26 |
| | (22) | SPHERIC | -77.4133 | 2.650 | | 26.18 |
| L11 | (23) | ASPHERIC | -2424.2334 | 6 | 1.4909 / 58.03 | 25.67 |
| | (24) | ASPHERIC | 89.8341 | 8.148 | | 26.2 |
| L12 | (25) | SPHERIC | 48.5532 | 10.356 | 1.8467 / 23.78 | 24.15 |
| | (26) | SPHERIC | 601.8274 | 3.367 | | 23.4 |
| L13 | (27) | SPHERIC | -92.323 | 2 | 1.74400 / 44.90 | 23.4 |
| | (28) | SPHERIC | 39.939 | 16.510 | | 21.08 |
| L14 | (29) | SPHERIC | -26.6419 | 2.000 | 1.80420 / 46.50 | 21.08 |
| | (30) | SPHERIC | -55.2311 | 1.714 | | 24 |
| L15 | (31) | SPHERIC | -61.1179 | 2 | 1.80420 / 46.50 | 25.28 |
| | (32) | SPHERIC | -1649.143 | 18.814 | | 31.36554841 |
| L16 | (33) | SPHERIC | -33.842 | 2.000 | 1.80420 / 46.50 | 30.5700523 |
| | (34) | SPHERIC | -63.018 | 6.768 | | 41.26065724 |
| L17 | (35) | ASPHERIC | -62.7244 | 7 | 1.4909 / 58.03 | 46.800 |
| | (36) | ASPHERIC | ######### | 885.600 | | 52.500 |
| IMAGE SURFACE | (37) | SPHERIC | ∞ | 0 | | |

FIG. 26B $$Z = \frac{c \cdot h^2}{1+\sqrt{1-(1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20}$$

—(EQUATION 1)

| | SURFACE 9 | SURFACE 10 | SURFACE 23 | SURFACE 24 | SURFACE 35 | SURFACE 36 |
|---|---|---|---|---|---|---|
| 1/c | 113.8712 | 144.7708 | -2424.2334 | 89.8341 | -62.7244 | -11437.9692 |
| K | 0 | 0 | 0 | 0 | 0 | 0 |
| A | -4.90185E-05 | -3.72718E-05 | -1.61990E-05 | -1.95163E-05 | -3.17076E-06 | -6.08359E-06 |
| B | -6.39302E-08 | -1.36397E-07 | 9.66326E-09 | 1.31505E-08 | 1.39734E-09 | 3.75346E-09 |
| C | 1.03877E-09 | 1.87447E-09 | 7.82796E-12 | 5.27314E-13 | -1.06081E-14 | -2.07042E-12 |
| D | -3.42899E-12 | -1.12684E-11 | -2.50431E-14 | -1.75106E-14 | -7.20539E-17 | 5.51740E-16 |
| E | -1.79938E-14 | -9.32754E-14 | 7.96099E-18 | 1.30708E-17 | 4.27998E-20 | 3.58722E-20 |
| F | 1.06132E-16 | 7.57316E-16 | 4.50798E-20 | 1.96990E-20 | 1.74158E-23 | -5.78352E-23 |
| G | 6.30457E-19 | 5.72031E-18 | -4.88096E-23 | -2.55484E-23 | -5.35429E-27 | -3.44294E-27 |
| H | -5.68754E-21 | -6.98749E-20 | -1.58662E-26 | -1.14232E-26 | -5.76226E-30 | 8.66881E-30 |
| J | 1.03177E-23 | 1.84619E-22 | 2.85473E-29 | 1.74711E-29 | 1.65034E-33 | -1.66272E-33 |

| | | 60 INCH | 80 INCH | 100 INCH |
|---|---|---|---|---|
| INTER-SURFACE DISTANCE | SURFACE S30 | 2.135 | 1.714 | 1.461 |
| | SURFACE S36 | 651.300 | 885.600 | 1119.970 |

| | | 60 INCH | 80 INCH | 100 INCH |
|---|---|---|---|---|
| Y | s37 | 607.1 | 809.5 | 1011.9 |

FIG. 27A

| NAME | SURFACE NO. | SHAPE | CURVATURE RADIUS | INTER-SURFACE DISTANCE | REFRACTIVE INDEX/ABBE NUMBER | EFFECTIVE DIA. (RADIUS) |
|---|---|---|---|---|---|---|
| OBJECT SURFACE | (0) | SPHERIC | ∞ | 3000 | | |
| INCIDENCE PUPIL | (1) | SPHERIC | ∞ | -3000 | | |
| | (2) | SPHERIC | ∞ | 5.977 | | |
| CONVERSION FILTER | (3) | SPHERIC | ∞ | 26.395 | 1.5168 / 64.20 | |
| | (4) | SPHERIC | ∞ | 2.9000 | | |
| L1 | (5) | SPHERIC | 27.5431 | 7.96 | 1.8467 / 23.78 | 17.5 |
| | (6) | SPHERIC | 284.149 | 0.200 | | 17 |
| L2 | (7) | SPHERIC | 51.068 | 3.430 | 1.8467 / 23.78 | 15.85 |
| | (8) | SPHERIC | 176.277 | 1.053 | | 15.2 |
| L3 | (9) | ASPHERIC | 31.2563 | 4.000 | 1.5251 / 56.46 | 13.45 |
| | (10) | ASPHERIC | 42.4680 | 0.300 | | 12.05 |
| L4 | (11) | SPHERIC | 31.1182 | 7.765 | 1.4875 / 70.44 | 11.1 |
| L5 | (12) | SPHERIC | -15.8163 | 2.000 | 1.8467 / 23.78 | 9.35 |
| L6 | (13) | SPHERIC | 22.2237 | 4.350 | 1.4875 / 70.44 | 7.9 |
| | (14) | SPHERIC | -18.9321 | 0.2 | | 7.7 |
| L7 | (15) | SPHERIC | -52.5215 | 2 | 1.80610 / 33.27 | 6.8 |
| L8 | (16) | SPHERIC | 14.8523 | 2.72 | 1.51823 / 58.96 | 5.95 |
| | (17) | SPHERIC | -56.1228 | 0.256 | | 5.9 |
| APERTURE DIAPHRAGM | (18) | SPHERIC | ∞ | 32.679 | | 5.8639 |
| L9 | (19) | SPHERIC | -82.2873 | 11.428 | 1.51823 / 58.96 | 23.35 |
| | (20) | SPHERIC | -30.6237 | 0.200 | | 24.35 |
| L10 | (21) | SPHERIC | 135.3731 | 9.601 | 1.64769 / 33.84 | 27.35 |
| | (22) | SPHERIC | -77.7848 | 0.300 | | 27.42 |
| L11 | (23) | ASPHERIC | 146.3056 | 6.5 | 1.4909 / 58.03 | 26.9 |
| | (24) | ASPHERIC | 50.9382 | 8.861 | | 27.45 |
| L12 | (25) | SPHERIC | 46.4555 | 13.500 | 1.76182 / 26.61 | 25.7 |
| | (26) | SPHERIC | 788.4952 | 2.988 | | 23.635 |
| L13 | (27) | SPHERIC | -107.463 | 2 | 1.6968 / 55.46 | 23.635 |
| | (28) | SPHERIC | 42.340 | 16.920 | | 21.425 |
| L14 | (29) | SPHERIC | -26.2342 | 2.000 | 1.80420 / 46.50 | 21.425 |
| | (30) | SPHERIC | -63.8471 | 0.558 | | 25.65 |
| L15 | (31) | SPHERIC | -78.1652 | 2 | 1.80420 / 46.50 | 26.75 |
| | (32) | SPHERIC | 644.483 | 19.934 | | 30.515 |
| L16 | (33) | SPHERIC | -33.846 | 2.000 | 1.80420 / 46.50 | 30.515 |
| | (34) | SPHERIC | -70.056 | 3.100 | | 43 |
| L17 | (35) | ASPHERIC | -52.9472 | 7.2 | 1.4909 / 58.03 | 44.800 |
| | (36) | ASPHERIC | -651.7227 | 882.400 | | 49.000 |
| IMAGE SURFACE | (37) | SPHERIC | ∞ | 0 | | |

FIG. 27B $$Z = \frac{c \cdot h2}{1+\sqrt{1-(1+K)c2 \cdot h2}} + A \times h4 + B \times h6 + C \times h8 + D \times h10 + E \times h12 + F \times h14 + G \times h16 + H \times h18 + J \times h20 \quad -\text{(EQUATION 1)}$$

| | SURFACE 9 | SURFACE 10 | SURFACE 23 | SURFACE 24 | SURFACE 35 | SURFACE 36 |
|---|---|---|---|---|---|---|
| 1/c | 31.2563 | 42.4680 | 146.3056 | 50.9382 | -52.9472 | -651.7227 |
| K | 0 | 0 | 0 | 0 | 0 | 0 |
| A | -1.70153E-05 | 4.17204E-06 | -1.24405E-05 | -1.53877E-05 | -1.07471E-06 | -6.32720E-06 |
| B | -1.01735E-07 | -1.62186E-07 | 3.56959E-09 | 3.22095E-09 | 2.20412E-09 | 4.84220E-09 |
| C | 9.89990E-11 | 7.36094E-10 | 4.62672E-12 | 8.08216E-12 | -4.90359E-13 | -3.26029E-12 |
| D | 1.44215E-13 | -2.16547E-12 | -7.94961E-15 | -2.04253E-14 | -1.77783E-16 | 1.05823E-15 |
| E | -1.14501E-14 | -1.10017E-13 | -2.92872E-18 | 1.53141E-17 | 9.96159E-20 | 5.41117E-20 |
| F | -1.38202E-17 | 4.53463E-16 | 2.18836E-20 | 1.38217E-20 | 4.63661E-23 | -1.33773E-22 |
| G | 5.02200E-19 | 5.87370E-18 | -3.05412E-23 | -4.13270E-23 | -9.38669E-27 | -8.59691E-27 |
| H | -8.26330E-22 | -5.88455E-20 | 1.76607E-26 | 3.22730E-26 | -1.25884E-29 | 2.54143E-29 |
| J | -2.96824E-24 | 1.50017E-22 | -4.31226E-30 | -8.44590E-30 | 3.54630E-33 | -5.39305E-33 |

| | | 60 INCH | 80 INCH | 100 INCH |
|---|---|---|---|---|
| INTER-SURFACE DISTANCE | SURFACE S30 | 0.982 | 0.558 | 0.300 |
| | SURFACE S36 | 649.999 | 882.400 | 1114.900 |

| | | 60 INCH | 80 INCH | 100 INCH |
|---|---|---|---|---|
| Y | s37 | 607.2 | 809.5 | 1011.8 |

OBLIQUE PROJECTION OPTICAL SYSTEM AND PROJECTION TYPE DISPLAY APPARATUS USING THE SAME

BACKGROUND OF THE INVENTION

This invention relates to a projection type display apparatus for enlarging an image displayed on a display screen of a display device and projecting the enlarged image on a projection screen or a projection board, and a projection optical system thereof, or in particular to a projection type display apparatus for projecting obliquely on the projection screen an image displayed on the display screen of a display device, an optical system thereof, and a method of machining a molded plastic lens constituting the optical system.

In the projection type display apparatus for displaying in an enlarged form, on a projection screen or a projection board, an image on a display screen of a liquid crystal panel of reflection type or transmission type or a displayed image of a display device with an array of a plurality of micro mirrors arranged thereon, it is important not only to produce a sufficiently enlarged image on the projection screen but also to prevent the shadow of a presenter from entering the projection screen and the enlarged image light from intruding directly into the eyes of the presenter. To meet this requirement, a projection optical system of what is called the short projection type in which the distance between the projection type display apparatus and the projection screen is decreased has begun to be placed on the market. This projection optical system is so configured that the enlarged image light enters the projection screen from an oblique direction (for example, JP-A-2008-250296).

Means for optically adjusting the oblique projection optical system using a curved mirror for oblique projection is also known (for example, JP-A-2002-35077).

On the other hand, a projection type display apparatus of rear projection type is known in which a mirror for returning optical path is interposed between the projection type display apparatus and the projection screen to decrease the apparent projection distance (for example, JP-A-2006-259252).

SUMMARY OF THE INVENTION

In the conventional art, or especially in an oblique projection optical system disclosed in JP-A-2008-250296 in which enlarged image light enters a projection screen from an oblique direction, a constitution is adopted in which a curved mirror is arranged between the projection optical system and the projection screen, and an intermediate image formed between the curved mirror and a coaxial projection optical system is enlarged by the curved mirror and projected as an enlarged image on the projection screen.

According to the technique disclosed in JP-A-2008-250296, therefore, the curved mirror is required to be moved in parallel along the optical axis of the coaxial projection optical system to change the magnification of the enlarged image on the screen, and for this purpose, a high-accuracy movement adjusting mechanism to prevent the curved mirror from tilting with respect to the optical axis. Such an adjusting mechanism, however, is not disclosed in JP-A-2008-250296.

JP-A-2002-350774, on the other hand, discloses an adjusting method in which a free-form curved mirror is simply moved, and fails to take into consideration a specific method of correcting phenomena unique to the oblique projection optical system such as trapezoidal distortion of the projected image due to the oblique projection on the projection screen and the aberration due to a difference in projection distances in the vertical direction on the projection screen. Also, JP-A-2002-350774 describes nothing about a method of fabricating the free-form curved mirror having negative power arranged between the projection optical system and the projection screen.

Further, the projector disclosed in JP-A-2006-259252 includes a mirror mechanism to rotate a mirror for reflecting light projected from a projection lens of the projector body, in which a fixing unit of the mechanism is fixed on the projector body to maintain the projection light from the projector body at a predetermined projection angle to the mirror. Thus, the rear projection is possible without shifting the projection lens in the projector body on the one hand, and the projector body is accommodated in the mirror mechanism for front projection (direct projection on the screen) on the other hand. In this way, this projector is designed to have a compact form in the case where the projector body is accommodated in the mirror.

In the projector disclosed in JP-A-2006-259252, however, the relative positions of the mirror and the projector body for rear projection are fixed, and there is not consideration on a method of changing the magnification of the enlarged image on the screen and a technical means for adjusting the position of the enlarged image for rear projection.

The present invention has been achieved in view of the aforementioned problems, and an object thereof is to provide an oblique projection optical system for projecting an image obliquely on the projection screen and a projection type display apparatus using such a system, wherein the trapezoidal distortion and the aberration due to the oblique projection are corrected with a compact configuration and in the case where the projection light is returned by a flat mirror and projected on the projection screen, limitation on the setting of the projection type display apparatus is remarkably improved.

Another object of the invention is to provide a projection type display apparatus including an oblique projection optical system configured of a plurality of lenses including at least one aspheric plastic lens, wherein the plastic lens is formed in an aspheric shape and thereby the machining time of the molding die is reduced as compared with the lens having a free-form curved surface, and the employment of a flat mirror for returning the optical path remarkably reduces the development cost.

In order to achieve the objective described above, according to one aspect of the invention, there is provided what is called an oblique projection optical system including a plurality of lenses for enlarging the image displayed on a display screen and projecting the enlarged image obliquely on a projection screen, wherein the lens nearest to the projection screen has a vertical effective area of the image through which an image light flux is passed and which is arranged at a position not containing the optical axis shared by a largest number of lenses among the plurality of lenses, and wherein the shape of the lens is asymmetrical about the optical axis thereof, thereby making it possible to correct the aberration caused by the ultra-wide angle and the distortion caused by the oblique projection.

For the reason described above, in the oblique projection optical system according to the invention, the height (shift amount) of the position of the displayed enlarged image with respect to the optical axis in the vertical direction of the screen can be increased, and therefore, a small flat mirror for returning the optical path can be arranged between the lens located at a nearest position to the projection screen and the projection screen.

Also, in order to reduce the size of the projection type display apparatus having the oblique projection optical system, an upper end of the effective area of the lens nearest to the projection screen in the vertical direction is arranged above an lower end of the effective area of the flat mirror in the vertical direction of the screen, and wherein this flat mirror has a predetermined angle of elevation with respect to the optical axis shared by the largest number of the lenses of the oblique projection optical system as well as this angle of elevation is changeable by a rotation adjusting mechanism.

Further, the oblique projection optical system according to the invention can maintain the image quality even at an ultra-wide angle. Accordingly, in the projection type display apparatus having this oblique projection optical system, a high magnification image can be produced even in the case where the distance is short between the projection screen and the projection type display apparatus, and the flat mirror can be moved by a flat mirror moving mechanism along the optical axis shared by the largest number of lenses.

Furthermore, the lens constituting the oblique projection optical system according to the invention and arranged nearest to the projection screen has the vertical effective area of the image, through which the light flux is passed, which is arranged at a position not containing the optical axis shared by the largest number of lenses among the plurality of lenses, and which has such a shape asymmetric about the center axis of the effective area thereof and a portion of the aspheric shape symmetric about the optical axis shared by the largest number of lenses is truncated.

According to another aspect of the invention, there is provided a projection type display apparatus including an oblique projection optical system configured of a plurality of lenses for enlarging the image displayed on the display screen and projecting the enlarged image obliquely on the projection screen, wherein the lens nearest to the projection screen has a vertical effective area of the image, through which the light flux passes, which is arranged at a position not including the optical axis shared by the largest number of lenses among the plurality of lenses, and which is accommodated in the range of maximum vertical width of the surface of the housing of the projection type display apparatus facing the projection screen.

According to still another aspect of the invention for achieving the objective described above, there is provided a projection type display apparatus including an oblique projection optical system configured of a plurality of lenses for enlarging the image on the display screen and projecting the enlarged image obliquely on the projection screen, wherein the lens nearest to the projection screen has a vertical effective area of the image through which the image light flux passes and which is arranged at a position not including the optical axis shared by the largest number lenses among the plurality of the lenses, wherein a flat mirror for returning the optical path is arranged between the lens nearest to the projection screen and the projection screen and has a rotation adjusting mechanism for changing the angle of the flat mirror with respect to the optical axis shared by the largest number of lenses, wherein in a first state where the flat mirror is arranged at a predetermined angle with respect to the optical axis shared by the largest number of lenses, an image enlarged by the image light flux returned by the flat mirror is obtained toward the display screen, while in a second state where the flat mirror is accommodated in the projection type display apparatus, an enlarged image is obtained in the direction along the extended optical axis shared by the largest number of lenses among the plurality of lenses.

According to still another aspect of the invention, there is provided a projection type display apparatus including a unit for detecting the rotation angle of the flat mirror and an image correction function for automatically correcting the distortion of the image projected on the screen in accordance with the detected rotation angle.

According to yet another aspect of the invention, there is provided a projection type display apparatus wherein in the case where the flat mirror for returning the optical path is arranged at a predetermined angle $\theta 1$ with respect to the axis perpendicular to the optical axis shared by the largest number of lenses, an enlarged image is obtained from the image light flux returned by the flat mirror as an image enlarged in the direction toward the display screen, the projection type display apparatus being tilted by $\theta 2$ with respect to a reference flat surface substantially perpendicular to the enlarged image, where $\theta 1$ and $\theta 2$ satisfy the following relationship:

$1.5 \leq \theta 2/\theta 1 \leq 2.0$

According to a further aspect of the invention, there is provided an oblique projection optical system, wherein the lens nearest to the projection screen among the plurality of lenses is formed of plastics and has a vertical effective area of the image, through which the light flux passes, which is arranged at a position not including the optical axis shared by the largest number of lenses among the plurality of lenses, and which has such a shape that a portion of the aspheric shape symmetric about the optical axis shared by the largest number of the lenses constituting the projection optical system is truncated, thereby making it possible to machine a plurality of molding dies arranged symmetrically about the optical axis shared by the largest number of lenses.

According to a still further aspect of the invention, there is provided an oblique projection optical system for projecting an image obliquely to the projection screen and a projection type display apparatus using the oblique projection optical system, wherein the trapezoidal distortion and the aberration due to the oblique projection are corrected with a compact structure that a small flat mirror can be accommodated in the projection type display apparatus, wherein in the case where the projection light is returned by the flat mirror and projected on the projection screen, the position of the projection image can be changed by adjusting the angle of the flat mirror, and wherein the limitation on the setting of the projection type display apparatus can be remarkably improved by moving the flat mirror in the direction along the optical axis and thus changing the magnification of the projection image.

According to a yet further aspect of the invention, there is provided an oblique projection optical system configured of a plurality of lenses, wherein the lens nearest to the projection screen has a vertical effective area of the image, through which the image light flux passes, and which is arranged at a position not including the optical axis shared by the largest number of lenses among the plurality of lenses, and wherein the particular lens has such a shape that a portion of the aspheric shape symmetric about the particular optical axis is truncated to remarkably reduced the time for machining the molding dies, and a flat mirror is used for the mirror for returning the optical path for a greatly reduced development cost.

Other objects, features and advantages of the invention will become apparent from the following description of the embodiments of the invention taken in conjunction with the accompanying drawings.

BRIEF DESCRIPTION OF THE DRAWINGS

FIG. 25A represents the data on the spherical system included in the lens data adapted for the projection lens to realize the oblique projection optical system according to a first embodiment of the invention.

FIG. 25B represents the data on the aspheric system included in the lens data adapted for the projection lens to realize the oblique projection optical system according to the first embodiment of the invention.

FIG. 26A represents the data on the spherical system included in the lens data adapted for the projection lens to realize the oblique projection optical system according to a second embodiment of the invention.

FIG. 26B represents the data on the aspheric system included in the lens data adapted for the projection lens to realize the oblique projection optical system according to the second embodiment of the invention.

FIG. 27A represents the data on the spherical system included in the lens data adapted for the projection lens to realize the oblique projection optical system according to a third embodiment of the invention.

FIG. 27B represents the data on the aspheric system included in the lens data adapted for the projection lens to realize the oblique projection optical system according to the third embodiment of the invention.

DETAILED DESCRIPTION OF THE EMBODIMENTS

Figure 1:
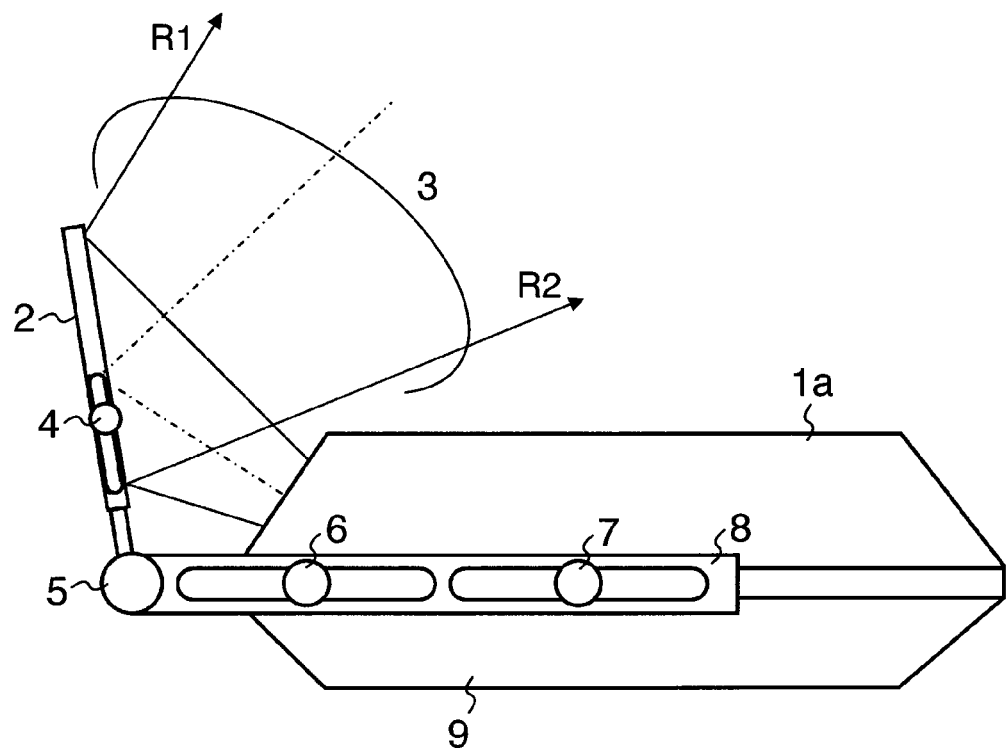
FIG. 1 is a side view of a projection type display apparatus including an oblique projection optical system and an optical path return mirror according to an embodiment of the invention.

The best aspect for implementing the invention is explained in detail below with reference to the accompanying drawings. Incidentally, in each of the drawings, elements having a same function are designated by same reference numerals, respectively, and explanations thereof are omitted.

Figure 2:
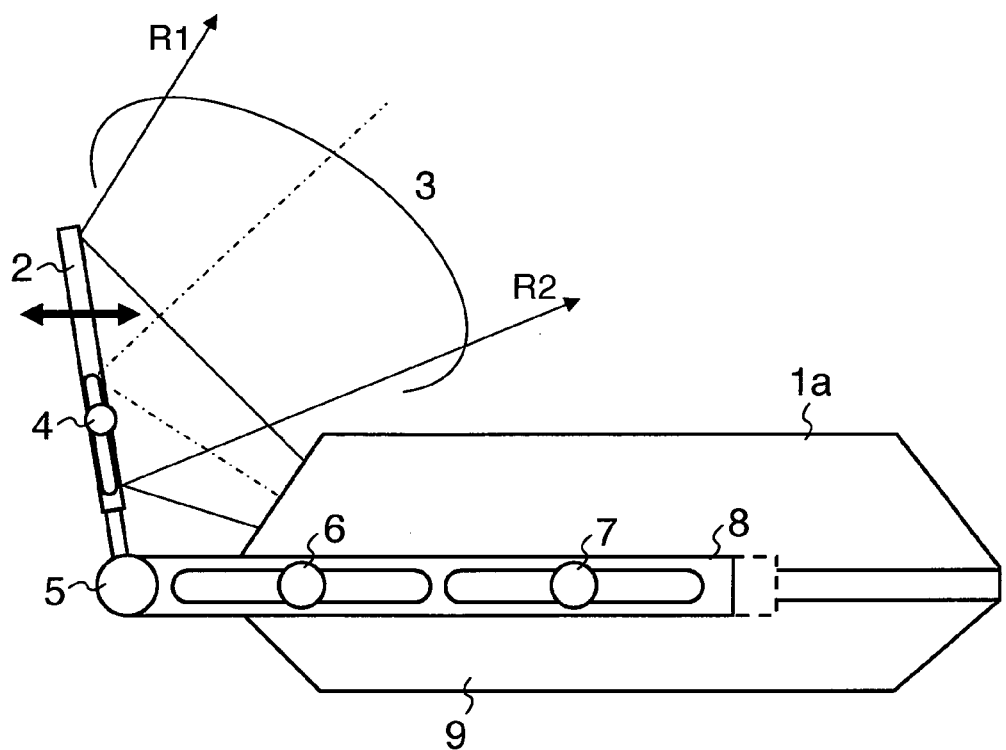
FIG. 2 is a side view of a projection type display apparatus including an oblique projection optical system and an optical path return mirror according to another embodiment of the invention.
Figure 3:
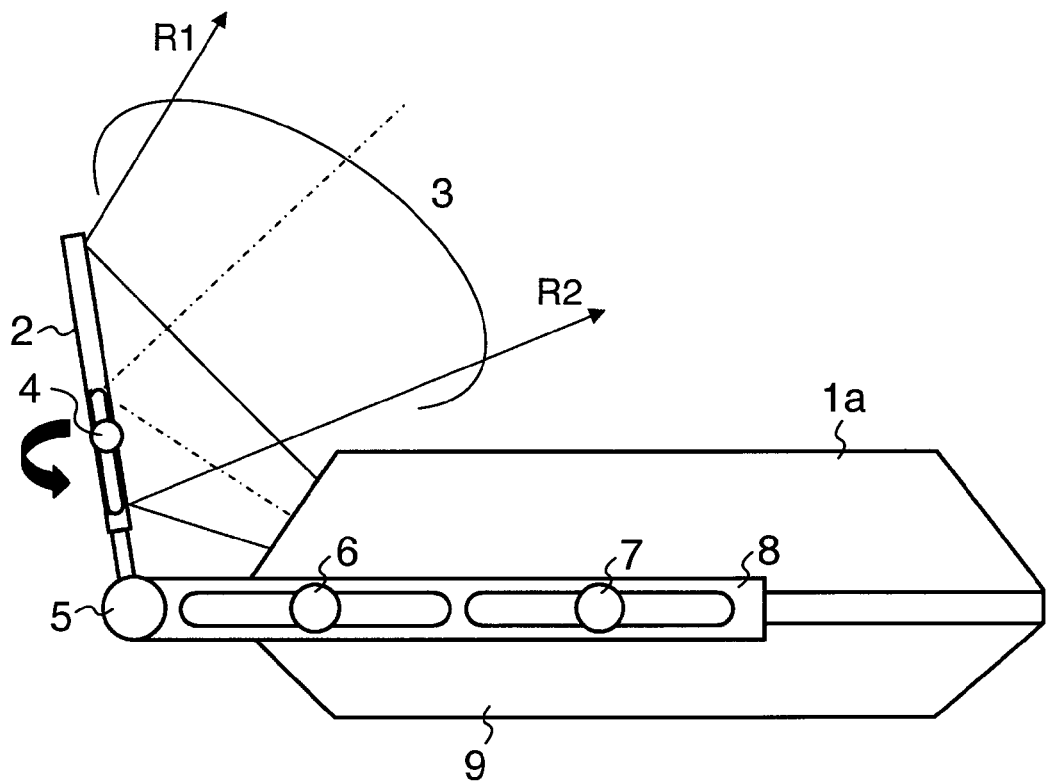
FIG. 3 is a side view of a projection type display apparatus including an oblique projection optical system and an optical path return mirror according to still another embodiment of the invention.

FIGS. 1 to 3 are side views each schematically illustrating a projection type display apparatus according to an embodiment of the invention. Especially, a projection type display apparatus is provided with an oblique projection optical system (not shown) in which a flat mirror (not shown) is fixed on a fixing frame 2 and an image light flux 3 is returned and projected obliquely on a projection screen directed toward a display screen (not shown). The main parts including the oblique projection optical system described above, an illumination optical system and circuit parts (not shown) are accommodated in a lower housing 9 and an upper housing 1a.

In FIGS. 1 to 3, reference numeral 4 designates a flat mirror rotation/fixing mechanism, and numeral 5 a rotation mechanism capable of adjusting the angle of the mirror fixing frame and, if required, includes a detection unit capable of detecting the angle of elevation of the flat mirror is provided. Numerals 6 and 7 designate fixing units for fixing a flat mirror moving mechanism, numeral 8 the flat mirror moving mechanism, R1 an upper limit of the enlarged image light flux in the vertical direction of the screen, and R2 an lower limit of the enlarged image light flux in the vertical direction of the screen.

Incidentally, a specific example of the lens configuration for realizing the oblique projection optical system of the projection type display apparatus according to this invention is explained in detail later.

In the projection type display apparatus according to this invention, as shown in FIG. 2, the flat mirror (not shown) is fixed on the fixing frame 2, and the image light flux 3 can be returned and projected obliquely on the projection screen in the direction toward the display screen (not shown). Accordingly, not only the apparent projection distance from the projection type display apparatus to the projection screen can be greatly reduced, but also the flat mirror can be moved by the moving mechanism 8 relatively to the housing of the projection type display apparatus and fixed at a predetermined position by the fixing units 6, 7, thereby making it possible to change the projection distance to the projection screen without moving the housing. As a result, not only the magnification of the image on the projection screen can be easily changed, but also, as shown in FIGS. 3 and 4, the angle of the flat mirror can be adjusted from a predetermined angle of elevation by the flat mirror rotation/fixing mechanism 4 or the mirror fixing frame rotation mechanism 5, thereby making it possible to move the image display position on the projection screen arbitrarily.

At the same time, one or both of the flat mirror rotation/fixing mechanism 4 and the mirror fixing frame rotation mechanism 6 is provided with a rotation angle detection unit (for example, a rotary encoder) capable of detecting the rotation angle of the flat mirror with respect to the predetermined angle of elevation, so that the automatic Keystone correction of the video circuit can be made in the vertical direction of the screen in accordance with the rotation angle obtained thereby to further improve the facility in operation.

Also, the projection type display apparatus according to this invention, as shown in FIG. 2, is designed in such a manner that in the case where the flat mirror (not shown) is fixed on the fixing frame 2 and the image light flux 3 is returned and projected obliquely on the projection screen in the direction toward the display screen (not shown), in order to reduce the effective area of the flat mirror, the interval between the projection type display apparatus and the flat mirror is shortened, and the amount of shift (defined as 10:0 in the case where the optical axis of the projection lens is superposed on the lower vertical end of the enlarged image, and as a negative value in the case where the lower vertical end of the enlarged image is above the optical axis assuming that the enlarged image width in the vertical direction is 10) of the oblique projection optical system assumes a negative value (i.e. so that the lower vertical end of the enlarged image is located above the optical axis).

Figure 4:
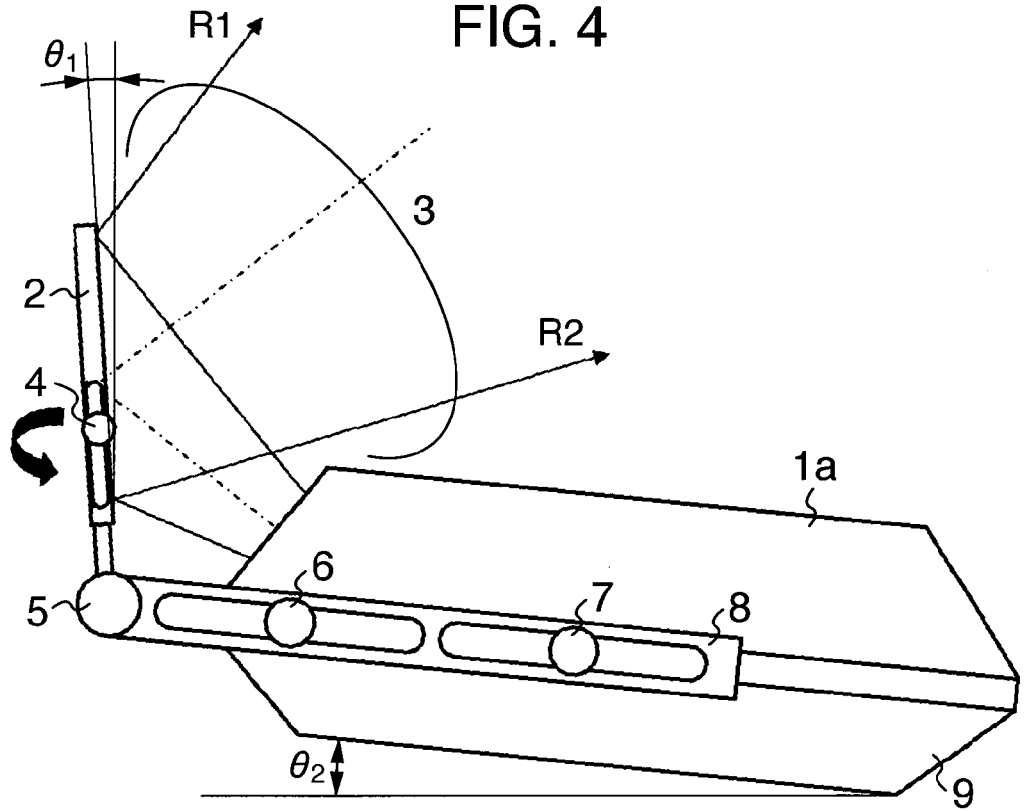
FIG. 4 is a side view of a projection type display apparatus including an oblique projection optical system and an optical path return mirror according to yet another embodiment of the invention.

In the projection type display apparatus according to this invention, in order to further shorten the interval between the projection type display apparatus and the flat mirror, the flat mirror is tilted, as shown in FIG. 4, by $\theta 1$ from a predetermined angle of elevation by the rotation/fixing mechanism 4 or the mirror fixing frame rotation mechanism 5, and the projection type display apparatus is tilted correspondingly by $\theta 2$ from the plane perpendicular to the projection screen. In this way, an enlarged image having little distortion of the projection screen can be obtained. In connection with this, the projection type display apparatus according to this invention was actually manufactured by way of trial and the relationship between the vertical keystone distortion correction and the image quality reduction due to the image processing was studied.

As a result, it was found that in the case where the ratio between $\theta 2$ and $\theta 1$ ($\theta 2/\theta 1$) is not larger than 1.5, the magnification of the image in the upper part of the projection screen in the vertical direction was enlarged than that of the image in the lower part thereof to such an excessive degree that the image quality is deteriorated even after the vertical Keystone correction was executed in the video circuit. On the contrary, in the case where the ratio between $\theta 2$ and $\theta 1$ ($\theta 2/\theta 1$) is not less than 2.5, the magnification of the image in the lower part of the projection screen in the vertical direction was enlarged as compared with that of the image in the upper part thereof to such an excessive degree that the image is deteriorated considerably even after making the vertical Keystone correction was executed by the video circuit. It has thus been found that in the case where the ratio between $\theta 2$ and $\theta 1$ ($\theta 2/\theta 1$) is set to near 2.0, the image quality deterioration can be minimized.

Figure 5:
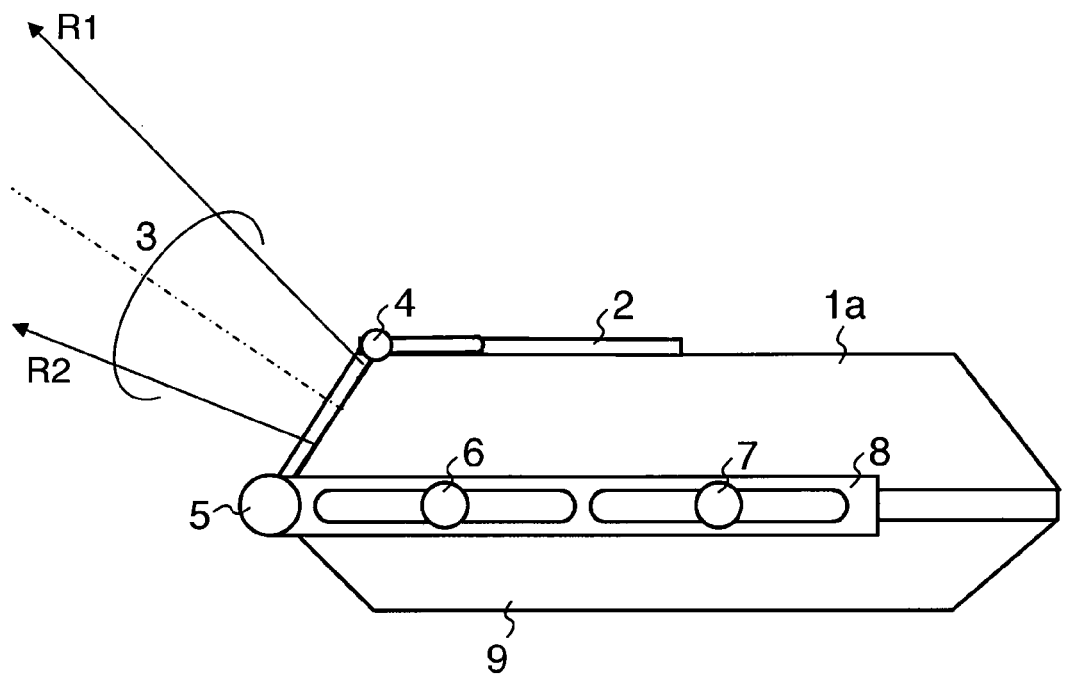
FIG. 5 is a side view of a projection type display apparatus including an oblique projection optical system and an optical path return mirror according to a further embodiment of the invention.
Figure 6:
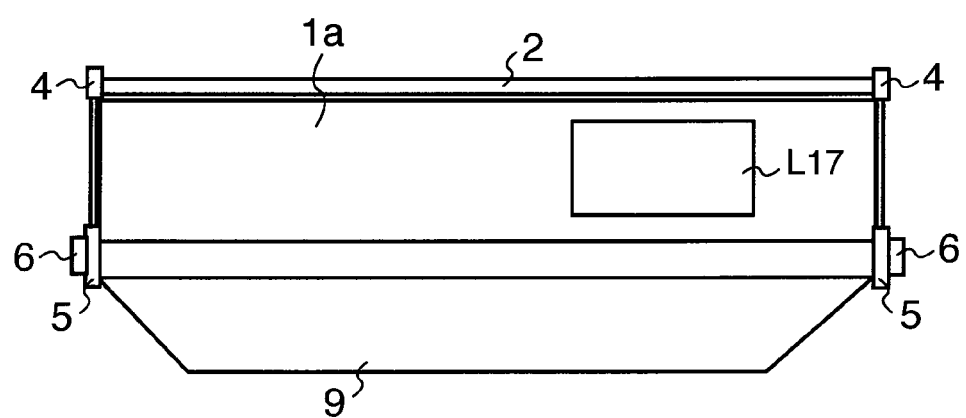
FIG. 6 is a front view of a projection type display apparatus including an oblique projection optical system and an optical path return mirror according to an embodiment of the invention.

FIGS. 5 and 6 are a side view and a front view, respectively, schematically illustrating the projection type display apparatus according to this invention in which the flat mirror (not shown) for returning the optical path is accommodated in the upper part of the set housing.

In the projection type display apparatus according to this invention, as illustrated in FIG. 5, the flat mirror (not shown) for returning the optical path fixed to the fixing frame 2 can be accommodated at a predetermined position in the upper part of the set housing by the flat mirror rotation/fixing mechanism 4, the mirror fixing frame rotation mechanism 5, the moving mechanism 8 and the fixing units 6, 7, and when the flat mirror is accommodated at such a position, the enlarged projection is possible in the direction along the optical axis shared by the largest number of lenses constituting the oblique projection optical system without returning the optical path.

FIG. 6 is a front view of the set schematically illustrating the projection type display apparatus according to this invention when the flat mirror (not shown) for returning the optical path is accommodated in the upper part of the set housing. Among the plurality of lenses constituting the oblique projection optical system, the lens (designated by L17 in FIG. 6) arranged at a position nearest to the projection screen is made to be a rectangle or a trapezoid shape having substantially the same aspect ratio as the effective area of the display screen. The vertical effective image area of this lens, which shuts off unrequired light and through which the light flux passes, is arranged at a position not including the optical axis shared by the largest number of lenses among the plurality of lenses, thereby the vertical effective image area of the lens is accommodated within the maximum vertical screen width of the surface of the housing of the projection type display apparatus facing the projection screen, resulting in a remarkably improved design quality.

The structure of the projection type display apparatus according to an embodiment of this invention has been described above in which an enlarged image is obtained regardless of whether the flat mirror for returning the optical path is accommodated or set open as shown in FIGS. 5 and 6. Nevertheless, a projection type display apparatus which is not usable when the optical path returning flat mirror is accommodated in the housing is of course within the scope of the present invention, as long as being provided with the oblique projection optical system according to this invention.

Figure 7:
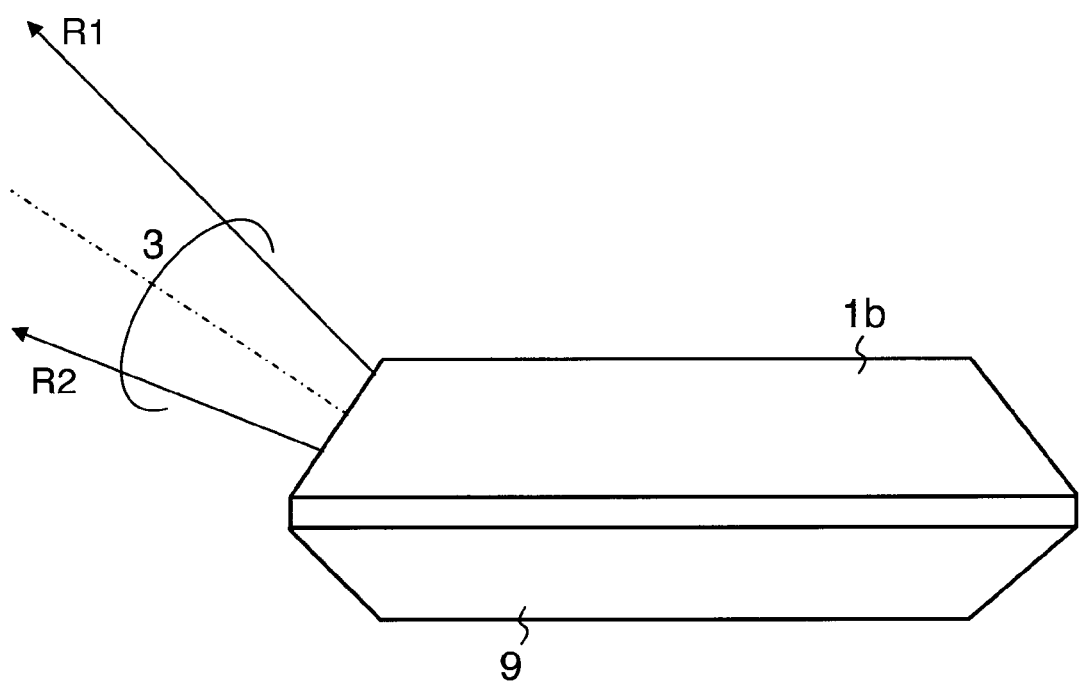
FIG. 7 is a side view of a projection type display apparatus including an oblique projection optical system according to an embodiment of the invention.

The projection type display apparatus according to another embodiment of this invention, as shown in FIG. 7, having no flat mirror for returning the optical path, is configured to project the image in enlarged form in the direction along the optical axis shared by the largest number of lenses constituting the oblique projection optical system.

Figure 8:
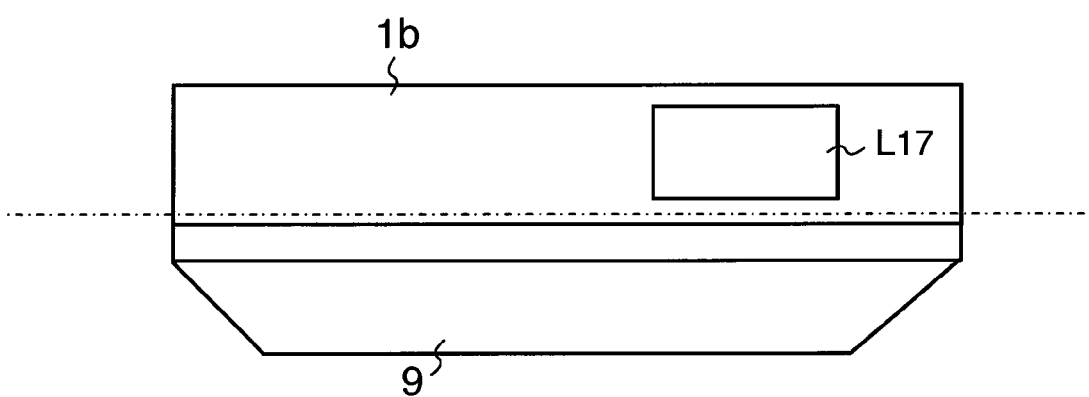
FIG. 8 is a front view of a projection type display apparatus including an oblique projection optical system according to an embodiment of the invention.

FIG. 8 is a front view of the set schematically illustrating a form of the projection type display apparatus according to another embodiment of this invention shown in FIG. 7, in which the lens (designated as L17 in FIG. 8) nearest to the projection screen among the plurality of lenses constituting the oblique projection optical system is of a rectangle or a trapezoid shape having substantially the same aspect ratio as the effective display screen area thereof, and the vertical effective image area of the lens to shut off the unrequired light and permit light flux to pass therethrough is arranged at a position not containing the optical axis shared by the largest number of lenses among the plurality of lenses. The vertical effective image area of the particular lens is thus accommodated within the maximum vertical screen width of the surface of the housing of the projection type display apparatus facing to the projection screen. Further, the center of the contour of the lens L17 mentioned above is located above the center line of the surface of the housing facing to the projection screen, thereby to exhibit a satisfactory balance of the appearance and a remarkably improved design quality.

Next, with reference to FIGS. 9 to 18, an oblique projection optical system employed in the projection type display apparatus is specifically explained. In order to minimize the projection distance of the projection type display apparatus, the lens nearest to the projection screen among the plurality of lenses constituting the oblique projection optical system is of a rectangle or a trapezoid shape having substantially the same aspect ratio as the effective display screen area thereof, and the vertical effective image area of the lens to shut off the unrequired light and permit the light flux to pass therethrough is arranged at a position not containing the optical axis shared by the largest number of lenses among the plurality of lenses. In this way, a short projection distance for oblique projection in enlarged form is secured.

<Oblique Projection Optical system for Short Distance Projection>

Figure 9:
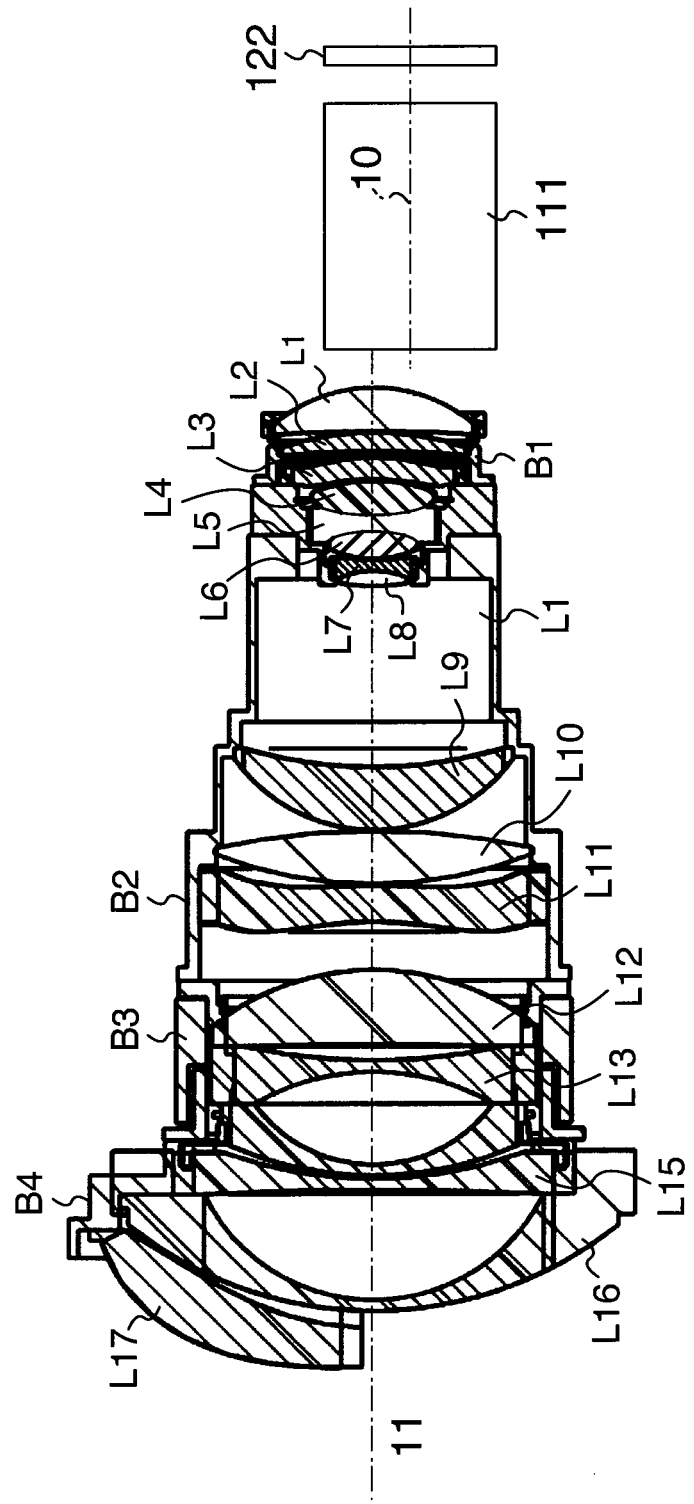
FIG. 9 is a sectional view of the projection lens showing the lens configuration of the oblique projection optical system according to this invention.

First, FIG. 9 is a sectional view illustrating the basic configuration of the projection optical system illustrated by the YZ section of the XYZ orthogonal coordinate system. For the convenience of explanation of the projection optical system, the liquid crystal panel 122 providing the display screen and the cross prism 111 are shown on the right side and the projection screen on the left side. This embodiment corresponds to the lens data represented in FIGS. 27A, 27B, and the lens L17 arranged at a position nearest to the projection screen is an aspheric plastic lens, of which the effective area for passing the image light flux is arranged at a position not including the optical axis 11 shared by a plurality of lenses constituting the oblique projection optical system. Thus, the light flux focused around the projection screen can be controlled simply by the shape of the lens L17, thereby making it possible to correct the trapezoidal distortion due to the oblique projection or the aberration due to the ultra-wide angle lens (especially, a high-order coma aberration and astigmatism). Also, the shape of the lens L17 is a rectangle having the aspect ratio substantially equal to that of the effective area of the display screen or a trapezoid corresponding to the area where the image light flux is passed, resulting in an advantage of shutting off the unrequired light which otherwise might deteriorate the focusing performance. Further, the contour of the lens L17 which is not circular symmetric about the optical axis 11 makes it possible to reduce the size. As a result, even in the case where the oblique projection optical system according to this embodiment is accommodated in the housing of the projection type display apparatus, the contour of the lens L17 can be accommodated within the maximum vertical screen width of the surface of the housing facing to the projection screen. At the same time, the center of the contour of the lens L17 is located above the center line of the surface of the housing facing the projection screen. Thus, a satisfactory balance of the external appearance can be secured and at the same time the design quality can be remarkably improved.

Figure 15:
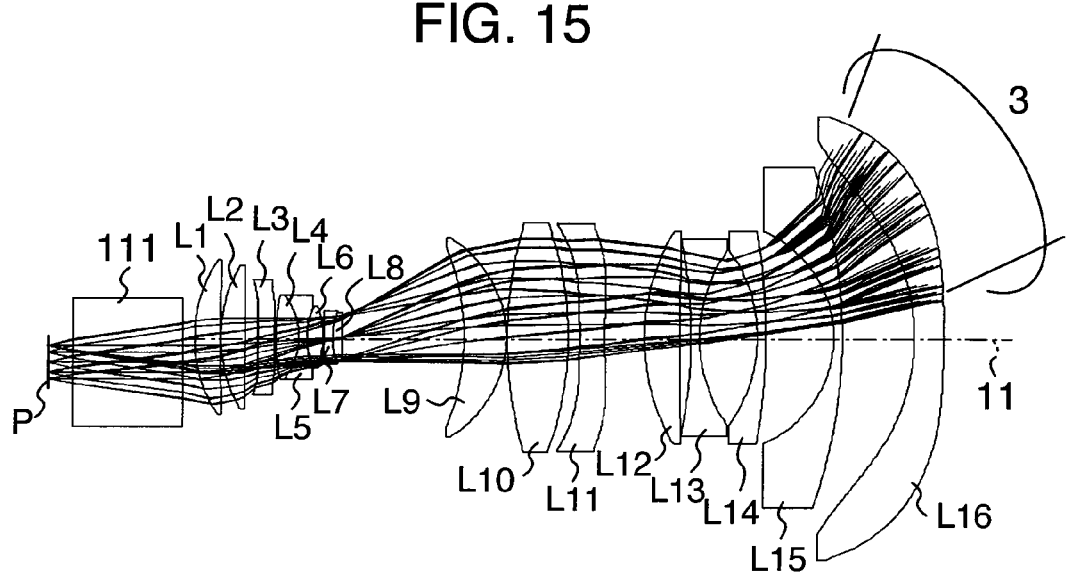
FIG. 15 is a sectional view illustrating the lens configuration of the oblique projection optical system and the light ray tracking result according to an embodiment (the lens data shown in FIGS. 25A, 25B) of the invention.

In FIG. 9, only the lens L17 is formed in the shape of a rectangle having substantially the same aspect ratio as the effective area of the display screen or a trapezoid (in the figure, the sectional shape is shown) corresponding to the area through which the image light flux passes. In the lens configuration for realizing the oblique projection optical system according to this invention, however, as illustrated in FIG. 15, the contours of the lenses L14 and L15, which also have an area not permitting the image light flux to pass therethrough, may be determined excepting such an area. In this way, the contour size can be reduced as compared with the contour of the conventional lens symmetric with respect of the optical axis, and the projection type display apparatus having this optical system can be effectively reduced in size and weight.

Although the lenses L3 and L11 are also aspheric plastic lenses, the effective area of each lens, through which the image light flux passes, is arranged at a position including the optical axis 11 shared by a plurality of lenses constituting the oblique projection optical system, and therefore, has an aspheric shape symmetric about the optical axis 11. The projection lens for realizing the oblique projection optical system according to this embodiment is composed of totally 17 lenses including 14 glass lenses and 3 plastic lenses and fixedly held by four lens barrels (B1, B2, B3, B4). Incidentally, in the case where the magnification is changed by changing the projection distance, the focus can be adjusted by changing the position of the lens barrel B4 relative to the position of the lens barrel B3.

Figure 10:
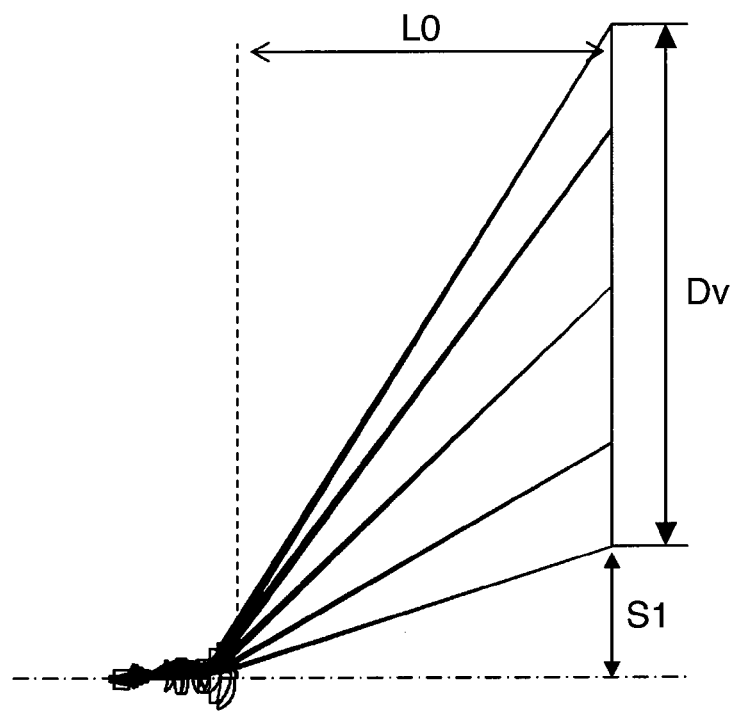
FIG. 10 is a sectional view showing the lens configuration of the oblique projection optical system and the light ray tracking result according to the invention.

In the embodiment shown in FIGS. 10 to 15, the origin of the XYZ orthogonal coordinate system is set at the center of the display screen of the liquid crystal panel 122 for displaying an image by modulating the illumination light flux with video signals, and the Z axis is assumed to be parallel to the normal to the liquid crystal panel 122 (not shown) for displaying the image. The Y axis is parallel to a short side of the display screen of the liquid crystal panel 122 for displaying the image, and assumed to be equal to the vertical direction of the image display liquid crystal panel 122. The X axis is parallel to a long side of the display screen of the liquid crystal panel 122 for displaying the image, and assumed to be equal to the horizontal (lateral) direction of the liquid crystal panel 122 for displaying the image. Also, FIG. 10 is a sectional view of the projection lens of the oblique projection optical system of the projection type display apparatus according to an embodiment, and FIG. 10 is a sectional view of the projection lens including but not showing the flat mirror for returning the optical path.

Figure 12:
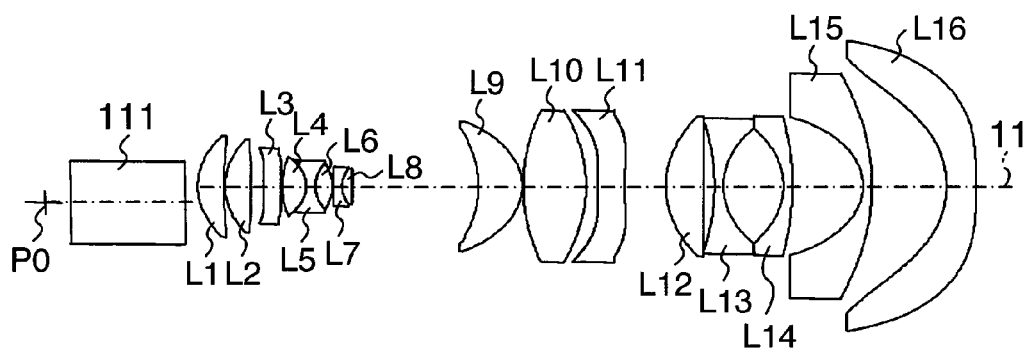
FIG. 12 is a sectional view of the projection lens having the lens configuration of the oblique projection optical system according to an embodiment (the lens data shown in FIGS. 25A, 25B) of the invention.
Figure 13:
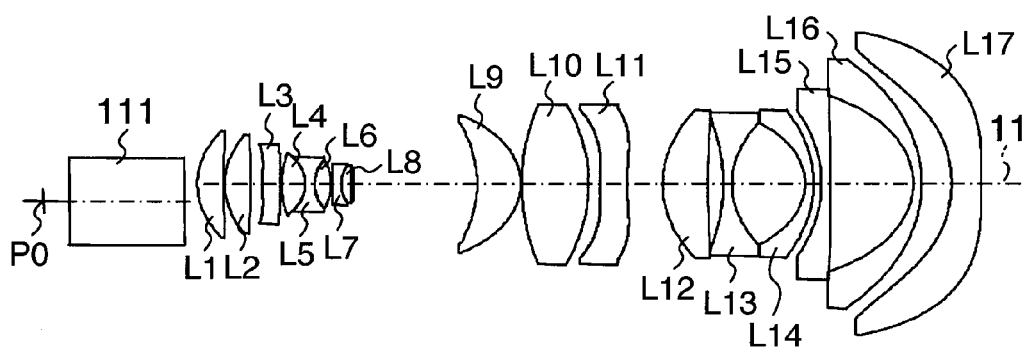
FIG. 13 is a sectional view of the projection lens having the lens configuration of the oblique projection optical system according to another embodiment (the lens data shown in FIGS. 26A, 26B) of the invention.
Figure 14:
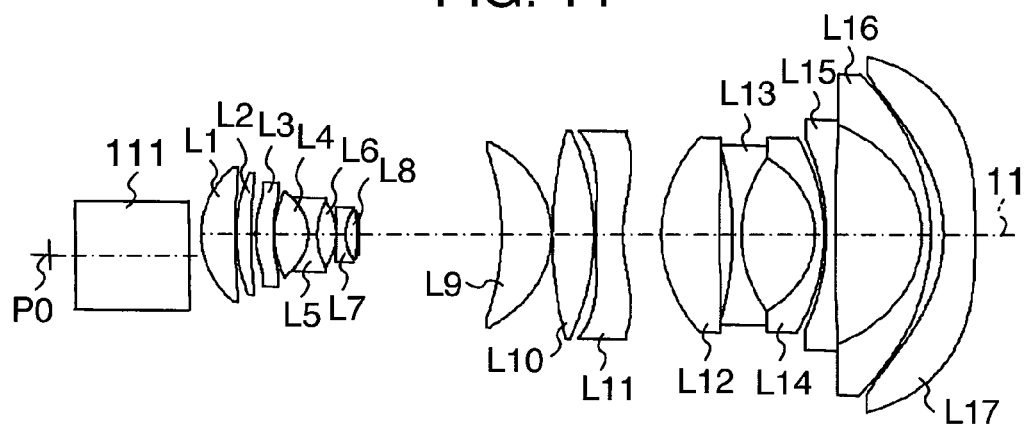
FIG. 14 is a sectional view of the projection lens having the lens configuration of the oblique projection optical system according to still another embodiment (the lens data shown in FIGS. 27A, 27B) of the invention.

A sectional view of the projection lens for realizing the oblique projection optical system according to a first embodiment of this invention is shown in FIG. 12, data on a spherical system included in lens data obtainable in the process is represented in FIG. 25A, and data on an aspheric system similarly obtainable is represented in FIG. 25B. Also, a sectional view of the projection lens for realizing the oblique projection optical system according to a second embodiment is shown in FIG. 13, data on a spherical system included in lens data obtainable in the process is represented in FIG. 26A, and data on an aspheric system obtainable is represented in FIG. 26B. Similarly, a sectional view of the projection lens for realizing the oblique projection optical system according to a third embodiment is shown in FIG. 14, data on a spherical system included lens data obtainable in the process is represented in FIG. 27A, and the data on an aspheric system similarly obtainable is represented in FIG. 27B.

Figure 11:
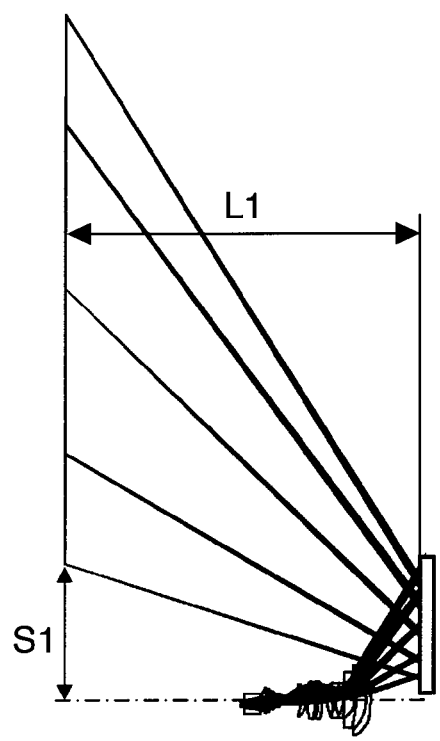
FIG. 11 is a sectional view showing the lens configuration of the oblique projection optical system and the light ray tracking result according to the invention.

In each lens data, projection distances L0, L1, an amount of shift S1 from the optical axis at the image display position and a vertical image size Dv represented in FIGS. 10 and 11 are summarized in Table 1 below.

TABLE 1

|  |  |  | L0(mm) | Dv(mm) | S1(mm) |
| --- | --- | --- | --- | --- | --- |
| 60" | Projection | Embodiment 1 | 650.1 | 747.1 | 186.8 |
| 60" | Projection | Embodiment 2 | 651.3 | 747.1 | 186.8 |
| 60" | Projection | Embodiment 3 | 650.0 | 747.1 | 186.8 |
| 80" | Projection | Embodiment 1 | 885.6 | 996.1 | 249.0 |
| 80" | Projection | Embodiment 2 | 885.6 | 996.1 | 249.0 |
| 80" | Projection | Embodiment 3 | 882.4 | 996.1 | 249.0 |
| 100" | Projection | Embodiment 1 | 1011.7 | 1245.0 | 331.3 |
| 100" | Projection | Embodiment 2 | 1011.9 | 1245.0 | 331.3 |
| 100" | Projection | Embodiment 3 | 1011.8 | 1245.0 | 331.3 |

In the projection lens for realizing the oblique projection optical system according to the invention, the amount of shift S1 for the size Dv in the vertical direction of the image can be set to 20% or more. Also, the ratio D/L0 between the projection screen size D (mm) and the projection distance L0 (mm) for the general the projection type display apparatus of 60 inches has a screen size of 1524 (mm) and a projection distance of 1800 (mm), and in this case the ratio D/L0 is 0.85. A shorter projection distance is about 1000 (mm), and in this case the ratio D/L0 is 1.52. In the oblique projection optical system according to this invention, as described above, even a D/L of 2.0 or more is realizable, and according to an embodiment, a ratio of 2.34 is actually obtained.

According to this invention, the projection type display apparatus having a flat mirror for returning the optical path can also be realized as shown in FIG. 11. The result of manufactured by way of trial indicates that the interval between the lens arranged at a position nearest to the projection screen and the flat mirror is about 150 mm, and therefore, L1 represented in FIG. 11 is shortened by about 150 mm compared to L0. Also, in the case where the depth of the set is assumed to be 350 mm, the distance from the projection type display apparatus according to the invention to the projection screen with the light returned by the flat mirror is shortened by 500 mm compared to L0. This leads to great advantages that a large image can be obtained with a small installation space and the presenter does not directly view the image light of the projection type display apparatus.

Next, a specific method of reading the lens data and the mechanism for correcting the aberration of the projection lens to realize the oblique projection optical system according to an embodiment of the invention are explained with reference to the lens data represented in FIGS. 25A, 25B for the projection lens according to the first embodiment having a configuration in FIG. 12. In general, the lenses are configured in three groups, and those L16 to L12 from the projection screen side form the third group. All of L16 to L13 are concave lenses having a telocentric configuration. At the same time, in order to reduce the chromatic aberration of magnification, a convex lens formed of a lens material small in Abbe number is arranged as L12. Further, as represented in FIG. 15, L16 is arranged at a position not including the optical axis 11 shared by a plurality of lenses constituting the oblique projection optical system. In this way, a strong aspheric shape in which the light flux focused around the screen can be controlled by the lens shape of L16 alone used to correct the trapezoidal distortion caused by the oblique projection and the aberration due to the ultra-wide angle lens (especially, the high-order coma aberration and the astigmatism). In the process, the contour of the lens L16 is not required to be circular symmetric about the optical axis for the aforementioned reason, but may be a rectangle shape having an aspect ratio substantially equal to that of the effective area of the displays screen or a trapezoid corresponding to the area through which the image light flux is passed. As a result, unrequired light which otherwise might deteriorate the focusing performance can be advantageously shut off. Further, the fact that the contour of the lens L16 is not circular symmetric about the optical axis can reduce the size, with the result that even in the case where the oblique projection optical system according to this embodiment is accommodated in the housing of the projection type display apparatus, the contour of L16 can be set within the vertical maximum screen width of the surface of the housing facing to the projection screen. At the same time, the contour center of L16 is located above the center line of the surface of the housing facing the projection screen, resulting in a satisfactory balance of external appearance for a remarkably improved design property.

Further, L11 to L9 make up a second group, in which L11 is a lens having a strong aspheric shape with a weak negative refractive power, and corrects the spherical aberration and the low-order coma aberration caused by a light flux substantially parallel to the optical axis and passing through a place distant from the optical axis. The lenses L10 and L9, on the other hand, take charge of a part of the refractive power of the glass projection lens having a positive refractive power, and at the same time the lens L9 suppresses the occurrence of the coma aberration and the astigmatism in the shape of a meniscus convex toward the projection screen.

Finally, L8 to L1 constitute a first group, in which the doublet lens of L8 and L7 and the triplet lens of L6 to L4 are rendered to have a negative refractive power and thus a strong telecentric property. Further, the lens L3 having a strong aspheric shape corrects zonal coma aberration caused by a light flux oblique to the optical axis and passing through a place distant from the optical axis. As a result, the distortion was suppressed and a satisfactory focusing performance of the projection lens as a whole was realized in oblique projection. The projection lenses according to other embodiments of the invention illustrated in FIGS. 13, 14 are equivalent to a configuration in which L15 illustrated in FIG. 12 is divided into L15 and L16 for an improved aberration correction ability and in which the aspheric lens L16 illustrated in FIG. 12 is simply replaced by the lens L17, while the result that the effects and the configuration of the projection optical system remain the same.

Next, the oblique projection optical system described above is further explained using specific numerical values with reference to FIGS. 25A, 25B, FIGS. 26A, 26B and FIGS. 27A, 27B.

First, FIG. 12 shows the configuration of the projection optical system according to this embodiment based on an example of the numerical values listed in FIGS. 25A, 25B. In other words, FIG. 12 shows the configuration of the YZ section in the XYZ orthogonal coordinate described above. The image projection apparatus according to the invention, as illustrated in FIGS. 1 to 6, is realizable also in a configuration having a mirror for returning the optical path (not shown). For convenience' sake, however, an explanation is given on the assumption that the mirror for returning the optical path is not present as illustrated in FIGS. 7, 8. The configuration of the projection optical system of FIG. 12 is shown as a development in the direction along Z axis. This is also the case with FIGS. 13 to 15.

Light emitted from the display screen P0 (a liquid crystal panel according to the embodiment) indicated under the optical axis 11 in FIG. 12 passes first through the first and second groups configured of only the projection lenses having a rotationally symmetric surface among the plurality of lenses. Then, the image light passes through the third group including the aspheric lens L16 rotationally asymmetric about the center of the lens contour and projected in enlarged form on the projection screen.

Here, the first and second groups of the projection lenses are configured of a plurality of lenses all having rotationally symmetric refraction surfaces, and four of the refraction surfaces are rotationally symmetric aspheric surfaces, while the other surfaces are spherical. The rotationally symmetric surfaces here are expressed by Equation (1) represented in FIG. 25B using the local cylindrical coordinate system for each surface.

In Equation (1), h is the distance from the optical axis, Z is the sag amount of the lens surface shape, c is the radius of curvature at the vertex, K is the conic constant and A to J are the coefficients of the terms of the powers of h.

Also, the radius of curvature of each surface is listed in FIG. 25A. In FIG. 25A, the radius of curvature having its center on a left side of the surface is expressed by a positive value, and otherwise, by a negative value. In FIG. 25A, the inter-surface distance indicates the distance from the vertex of a lens surface to the vertex of a next lens surface. The inter-surface distance is expressed as a positive value in the case where the next lens surface is located on the left side of a given lens surface in FIG. 25A, and as a negative value in the case where the next lens surface is located on the right side. Further, in FIG. 25A, the surface numbers (9), (10), (23), (24), (33) and (34) indicate aspheric surfaces rotationally symmetric about the optical axis, "aspheric"being written beside the surface number in the table of FIG. 25A to be easily understood.

The coefficients of these six aspheric surfaces are listed in FIG. 25B.

From the table represented in FIG. 25B, it is understood that the conic constant K is 0 according to this embodiment. The trapezoidal distortion caused by the oblique incidence is very large in the direction of oblique incidence, and small in the direction perpendicular to the direction. Therefore, considerably different functions are required in the direction of oblique incidence and in the direction perpendicular thereto. Thus, the asymmetric aberration can be satisfactorily corrected by not using the conic constant K functioning in all the directions in the rotational symmetry.

Incidentally, the numerical values described in the tables of FIGS. 25A, 25B assume a case in which an optically modulated optical image (modulated image) in a range of 0.59 inch diagonal with an aspect ratio of 16×9 on the display screen of the liquid crystal panel is projected in a form enlarged to sizes of 60 inches, 80 inches and 100 inches diagonal on the projection screen. In order to secure the optimum focusing performance for the enlarged image of each size, the lenses L15 and L16 are moved in parallel to the optical axis in such a manner that the lens intervals (30) and (34) assume the inter-surface intervals listed in the lower table in FIG. 25B.

The lens data listed in FIGS. 26A, 26B and 27A, 27B are also written in a similar format.

Figure 16:
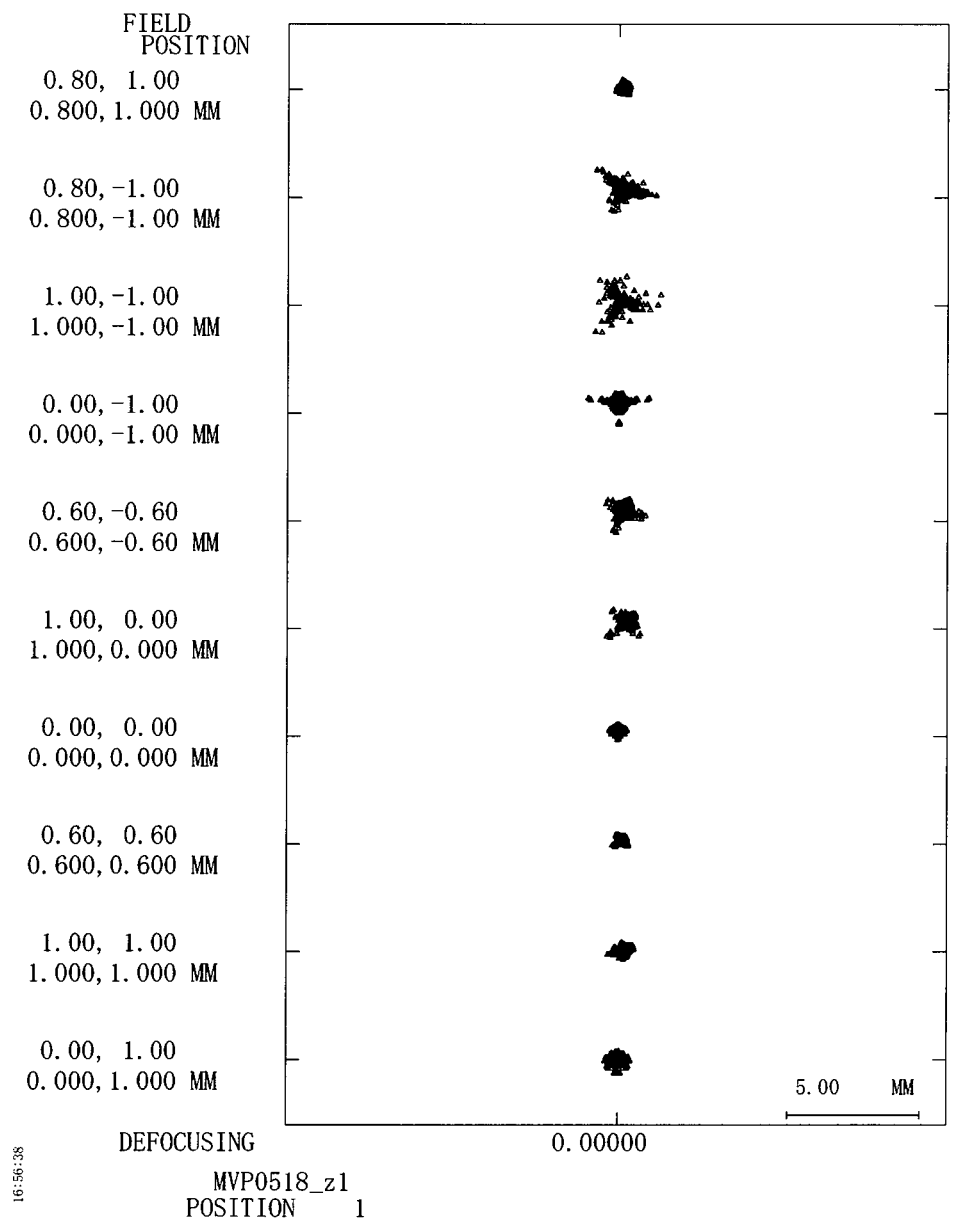
FIG. 16 is a diagram representing the spot shape of the projection image of the oblique projection optical system according to an embodiment (the lens data shown in FIGS. 25A, 25B) of the invention.
Figure 17:
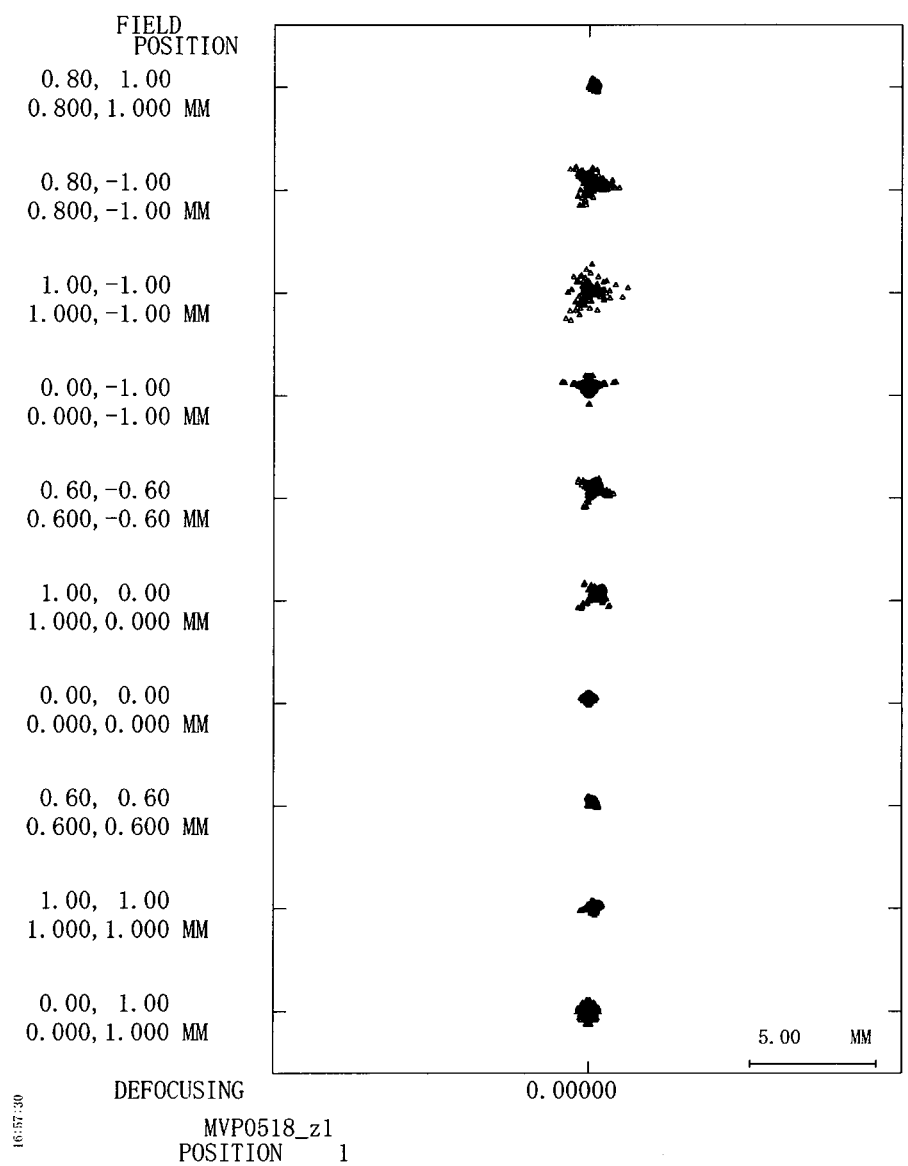
FIG. 17 is a diagram representing the spot shape of the projection image of the oblique projection optical system according to another embodiment (the lens data shown in FIGS. 26A, 26B) of the invention.
Figure 18:
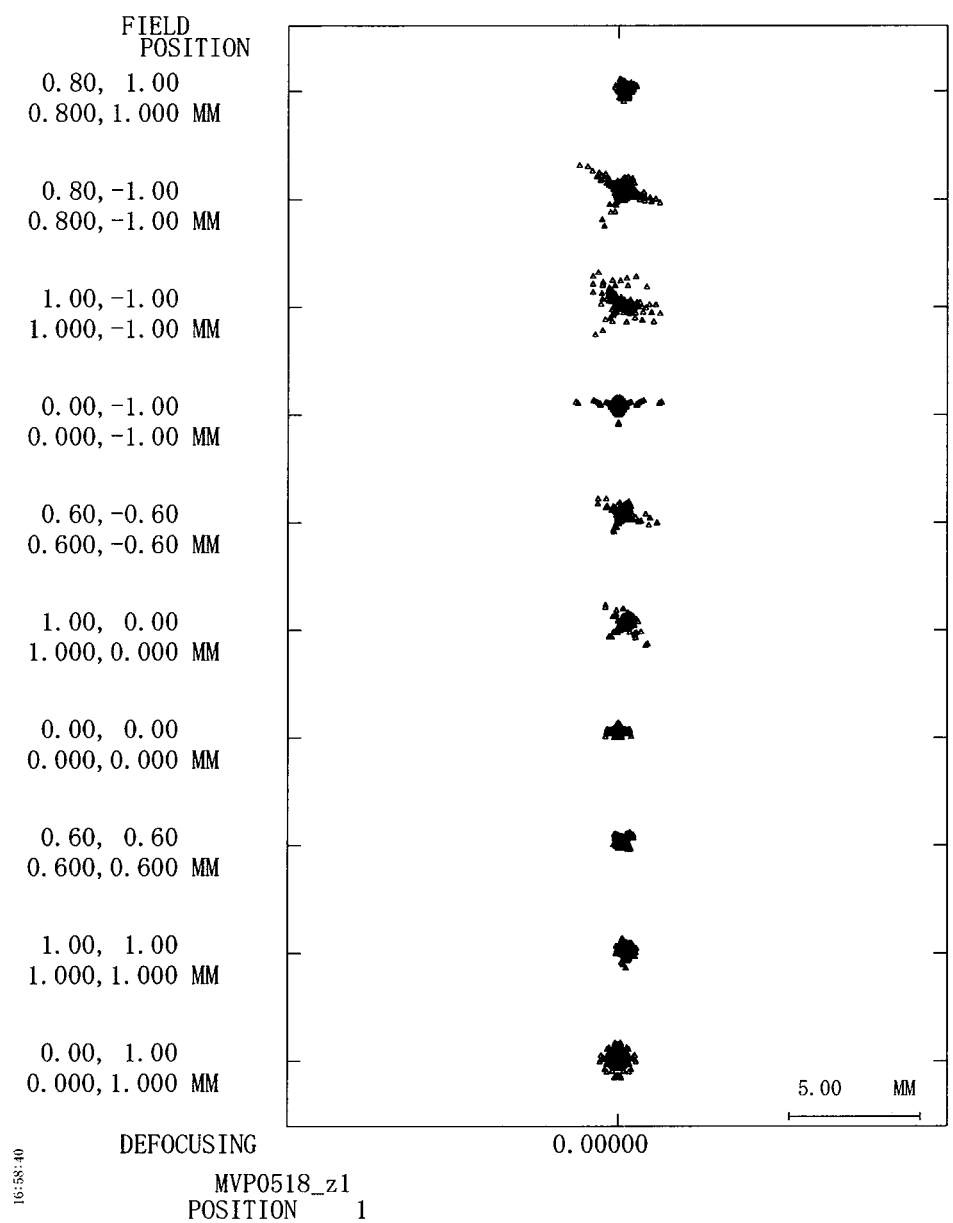
FIG. 18 is a diagram representing the spot shape of the projection image of the oblique projection optical system according to still another embodiment (the lens data shown in FIGS. 27A, 27B) of the invention.

Spot shapes of the image projected in the form enlarged to 80 inches using the lens data numerically listed in FIGS. 25A, 25B according to the first embodiment are represented in FIG. 16, and spot shapes of the image projected in the form enlarged to 80 inches using the lens data numerically listed in FIGS. 26A, 26B according to the second embodiment are represented in FIG. 17. Further, spot shapes of the image projected in the form enlarged to 80 inches using the lens data numerically listed in FIGS. 27A, 27B according to the third embodiment are represented in FIG. 18.

In FIG. 16, the spots of light fluxes emitted from ten points including the X-Y locating at (0, 3.67), (−6.53, 3.67), (−3.92, 2.20), (0.0, 0.0), (0, 0), (−6.53, 0.0), (−3.92, −2.20), (0, −3.67), (−5.53, −3.67), (−5.22, −3.67), (−5.22, 3.67) on the display screen of the liquid crystal panel are represented in the order from the bottom to up. Its scale unit is 5 mm. The horizontal direction in the spot diagram corresponds to the X direction on the display screen of the liquid crystal panel, and the vertical direction corresponds to the Y direction on the display screen of the liquid crystal panel. The spot diagrams represented in FIGS. 17, 18 are also obtained by the light flux from the points of similar values on the X-Y coordinate on the display screen of the liquid crystal panel. From these diagrams, it is understood that a satisfactory performance is maintained.

An oblique projection optical system for realizing the projection type display apparatus according to an embodiment of the invention have been described in detail above. The example described above is so configured that the light emitted from the projection lens is returned by the optical path returning flat mirror and proceeds toward the display screen of the liquid crystal panel. Nevertheless, the invention is not limited to this configuration, and depending on the position where the projection lens is arranged, the returning flat mirror may of course be omitted.

Figure 19:
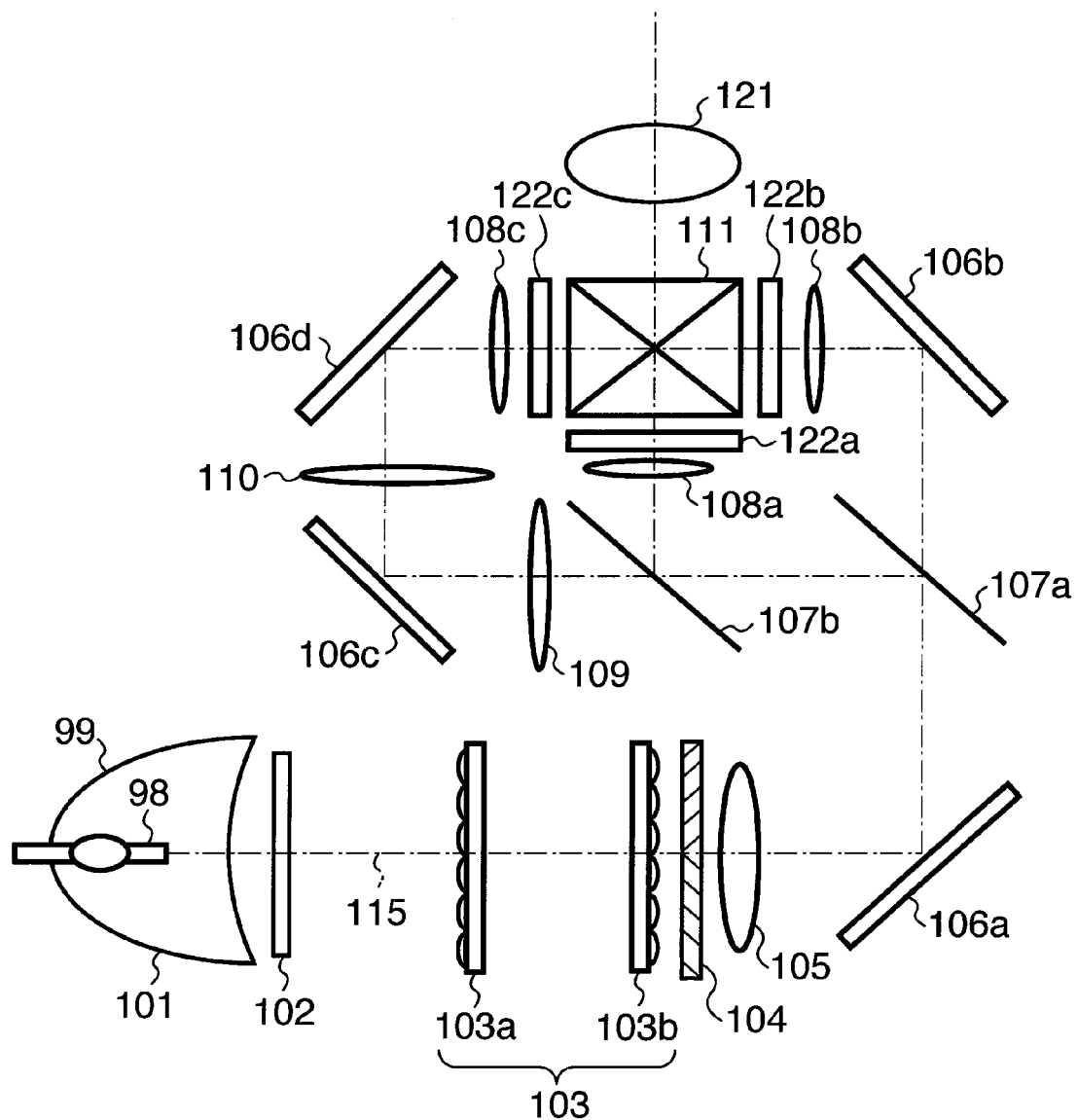
FIG. 19 is a diagram illustrating a configuration of the illumination optical system of the projection type display apparatus according to an embodiment.

Next, an illumination optical system used in the projection type display apparatus according to an embodiment of the invention is explained with reference to FIG. 19. In FIG. 19, a light source 101 includes a lamp 98 and a reflector 99. The lamp 98 is a high-pressure white mercury lamp. Also, the reflector 99, arranged in such a position as to cover the lamp 98 from behind, has a reflection surface in a shape of a paraboloid of revolution and a circular or polygonal exit opening. Light emitted from this lamp 98 is reflected by the reflector 99 having a reflection surface in the shape of the paraboloid of revolution, proceeds in a direction substantially parallel to an optical axis 115, and is emitted from the light source 101 as a substantially parallel light flux. The light emitted from the light source 101 enters an integrator of multi-lens type 103.

As described above, the multi-lens integrator 103 is configured of a first multi-lens element 103a and a second multi-lens element 103b. The first multi-lens element 103a is configured of a matrix array of a plurality of lens cells each in a shape of a rectangle substantially similar to the liquid crystal panels 122a, 122b, 122c as viewed from the direction along the optical axis 115. The light incident from the light source is divided into a plurality of light rays through the plurality of the lens cells and thereby efficiently led through the second multi-lens element 103b and a polarization conversion element 104. Specifically, the first multi-lens element 103a is designed so that the lamp 98 and each lens cell of the second multi-lens element 103b are in optically conjugate with each other.

The plurality of lens cells of the second multi-lens element 103b, like those of the first multi-lens element 103a, are each in a shape of a rectangle as viewed from the direction along the optical axis 115 and arranged in matrix. Each of the lens cells constituting the second multi-lens element 103*b* projects (maps) the shape of the corresponding lens cell of the first multi lens element 103*a* on the liquid crystal panels 122*a*, 122*b* and 122*c* in cooperation with the superposition lenses 108*a*, 108*b* and 108*c*. In the process, the polarization conversion element 104 functions to set the light from the second multi-lens element 103*b* in a predetermined direction of polarization. At the same time, the image projected through each lens cell of the first multi-lens element 103*a* is superposed by the superposition lenses 108*a*, 108*b* and 108*c*, thereby the light amount is uniformly distributed on the corresponding liquid crystal panels 112*a*, 112*b* and 112*c*.

Among the plurality of lenses constituting the oblique projection optical system according to the invention, the lens arranged nearest to the projection screen is made of plastics, and the effective area thereof in the vertical direction of the image through which the light flux passes is arranged at a position not containing the optical axis shared by the largest number of lenses among the plurality of lenses. This plastic lens is in such a shape that a portion of the aspheric shape symmetric about the optical axis shared by the largest number of lenses constituting the projection optical system is truncated.

Figure 21:
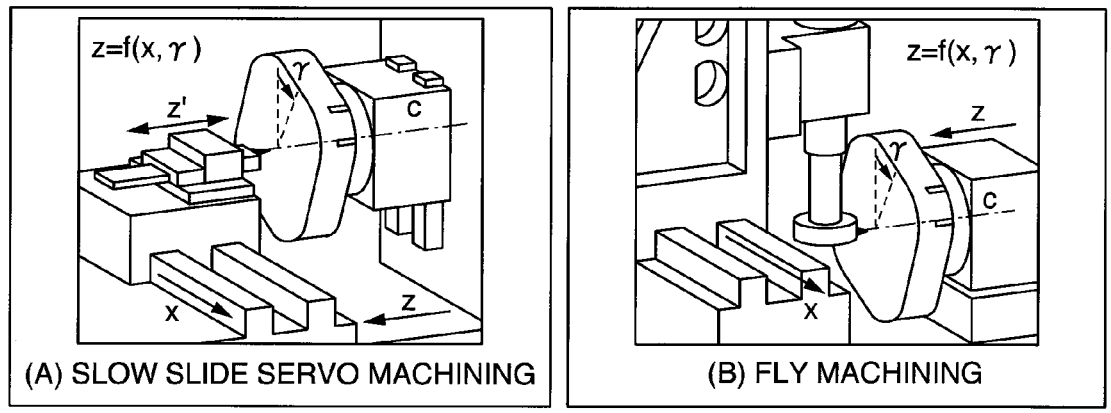
FIG. 21 is a diagram schematically illustrating a method of the machining operation on the lens surface shaping machine for the die to mold the plastic lens.

The molding die is machined by a method shown in FIG. 21(A) in which a die being a work is rotated and cut with a cutting tool on a multi-spindle machine to produce a die in the shape corresponding to the desired lens shape, or by a method shown in FIG. 21(B) in which a work is fixed while rotating a cutting tool thereby to machine the die to the required shape. To obtain a mirror surface, the method (B) requires the cutting time about 10 to 20 times longer than the method (A). The method (B) is advantageously used to machine a rotationally asymmetric free-form curved surface, while the method (A) is suitable to machining a rotationally symmetric aspheric work in a shorter time.

Among the plurality of the lenses constituting the oblique projection optical system according to the invention, the lens arranged nearest to the projection screen is made of plastics, and the vertical effective image area thereof through which the light flux passes is arranged at a position not containing the optical axis shared by the largest number of lenses among the plurality of lenses. This plastic lens is in such a shape that a portion of the aspheric shape symmetric about the optical axis shared by the largest number of lenses constituting the projection optical system is truncated. Thus, the method of machining the molding die described above can be employed in which as shown in FIG. 21(A), the die being a work is rotated and cut with the cutting tool on the multi-spindle machine tool thereby to produce a die in the shape corresponding to the desired lens shape. As a result, the die machining operation is made possible in a short machining time and the development cost can be reduced.

Figure 22:
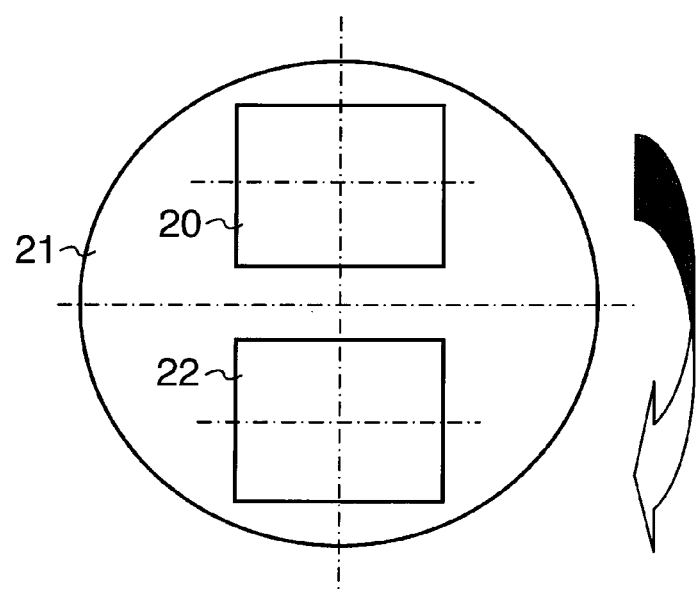
FIG. 22 is a diagram schematically illustrating the method of shaping the lens surface for the die to mold the plastic lens according to an embodiment of the invention.
Figure 23:
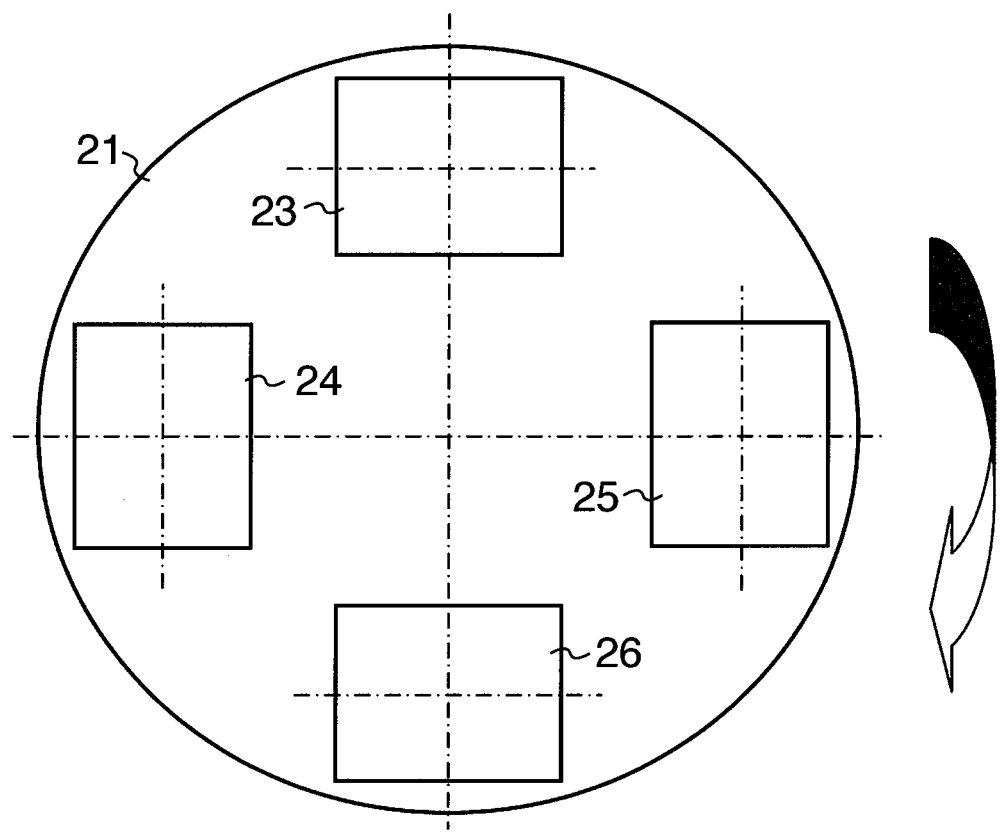
FIG. 23 is a diagram schematically illustrating the method of shaping the lens surface for the die to mold the plastic lens according to another embodiment of the invention.

In the process, according to this invention, a plurality of dies can be machined at the same time with the C axis as a rotation axis of the multi-spindle machine tool shown in FIG. 21(A). In the case where two dies are machined at the same time, for example, as shown in FIG. 22, two dies (work pieces) are arranged symmetrically about the rotation axis. Then, the desired die shape can be obtained with a high accuracy in satisfactory cutting balance in the machining operation. Further, FIG. 23 illustrates an optimum arrangement for machining four dies at the same time. Also in the case where an odd number of dies are machined at the same time, a similar effect can of course be obtained by arranging the adjacent dies at positions apart from each other by the rotation angle (360 degrees) divided by the number of the dies machined at the same time.

Figure 24:
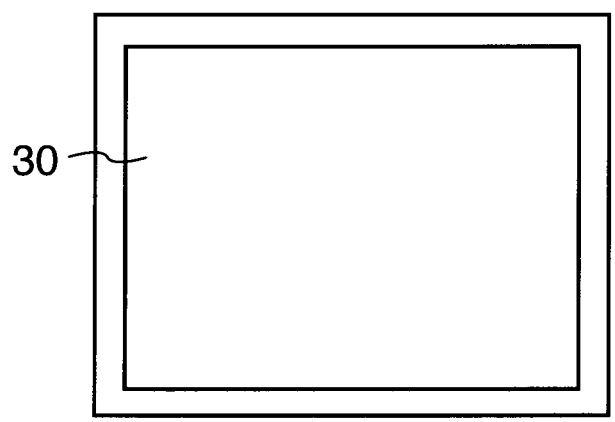
FIG. 24 is a diagram illustrating the contour of the plastic lens according to an embodiment of the invention.

In the oblique projection optical system according to the invention described above, the contour shape of the lens arranged at a position nearest to the projection screen is, for example, a rectangle as shown in FIG. 24. In that case, the shape of the lens surface is asymmetric about the center axis based on the contour shape of the effective lens surface, but an aspheric shape symmetric about the optical axis shared by the largest number of lenses constituting the oblique projection optical system.

Incidentally, in FIG. 9, only the lens L17 nearest to the projection screen is formed in a shape lacking the area where the image light flux is not passed, and arranged at a position not including the optical axis 11 shared by the largest number of lenses of the oblique projection optical system. Nevertheless, not only the lens L17 arranged nearest to the projection screen but also a plurality of lenses next nearest to the projection screen may be formed in the shape lacking the area where the image light flux is not passed. In this way, the oblique projection optical system can be reduced in size and weight.

Figure 28:
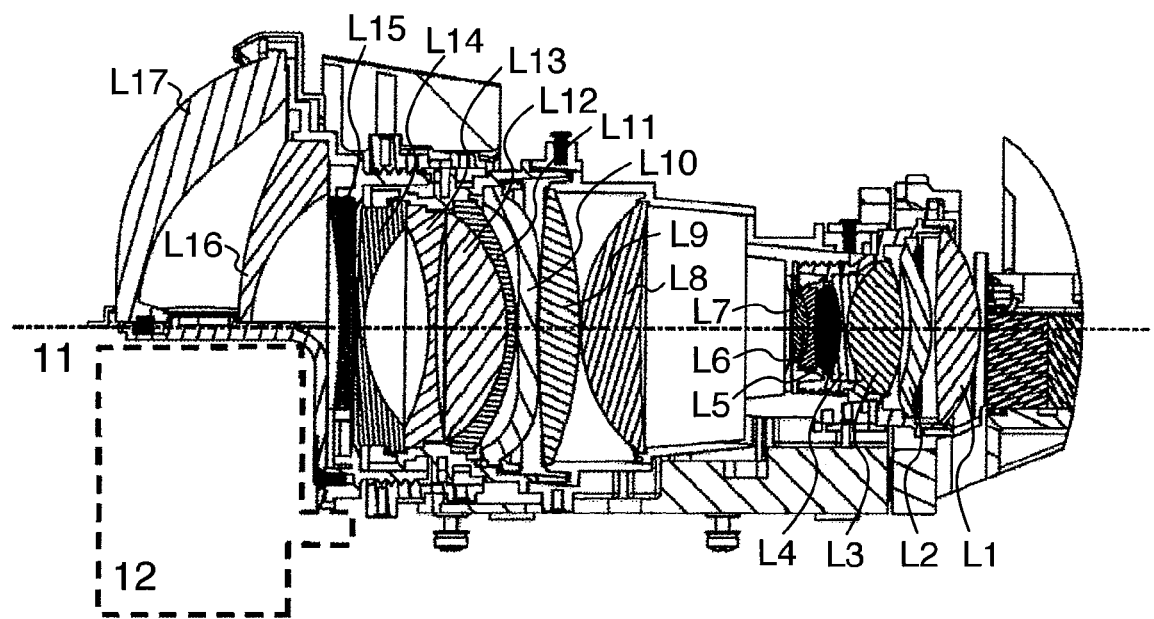
FIG. 28 is a sectional view of the projection lens illustrating the lens configuration of the oblique projection optical system according to an embodiment of the invention.

Specifically, in the configuration illustrated in FIG. 28, for example, not only the lens L17 nearest to the projection screen but also the lens L16 next nearest to the projection screen is arranged at a position not containing the optical axis 11 shared by the largest number of lenses of the oblique projection optical system. Further, the lens L15 arranged at the second next nearest position to the projection screen has a contour in a shape lacking a lower end area through which the image light flux is not passed. In the configuration shown in FIG. 28, therefore, as compared with the shape having the area through which the image light flux is not passed, the structure of the oblique projection optical system can be reduced in size and weight by an amount equivalent to a space 12 defined by a dotted line.

Figure 20:
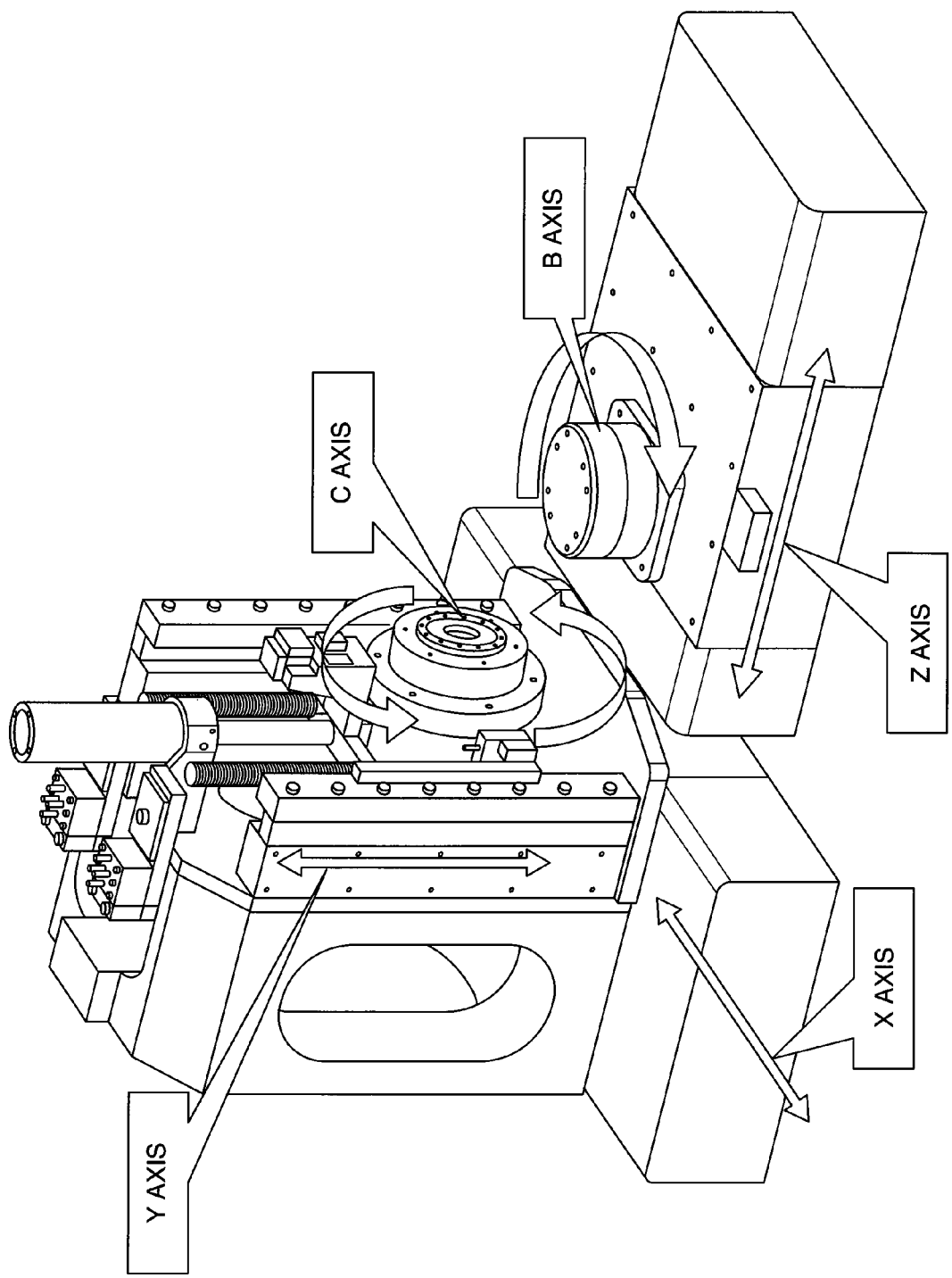
FIG. 20 is a diagram schematically illustrating the configuration of a lens surface shaping machine for the die to mold the plastic lens.

In the configuration shown in FIG. 28, the lens L17 is formed of plastics and arranged at a position not containing the optical axis shared by the largest number of lenses constituting the projection optical system. This plastic lens has such a shape that a portion of the aspheric shape symmetric about the optical axis is truncated. Thus, the molding die explained with reference to FIG. 20 can be machined in a shorter time at a lower initial cost, and resultingly, the lens can be fabricated at a low cost. Further, the lens L16, though formed of glass, is arranged at a position not containing the optical axis shared by the largest number of lenses constituting the projection optical system, and has such a shape that a portion of the spherical shape symmetric about the optical axis is truncated. Two lenses L16 can be fabricated by cutting one spherical glass into two parts, thereby making it possible to fabricate even glass lens at a low cost. Specifically, the greater the number of lenses which are arranged at a position not containing the optical axis 11 shared by the largest number of lenses constituting the oblique projection optical system and which have such a shape that a portion of the aspheric or spherical shape symmetric about the optical axis is truncated, the less expensively the oblique projection optical system can be fabricated. In the configuration shown in FIG. 28, only the lenses L17 and L16 correspond to such lenses. Nevertheless, a structure is desirable in which not only the single lens nearest to the projection screen, but as many lenses as possible not less than two, arranged nearest to the projection screen and having area through which the image light flux is not passed, are arranged at a position not containing the optical axis 11 shared by the largest number of lenses of the oblique projection optical system, and formed in such a shape that a portion of the aspheric or spherical shape symmetric about the optical axis is truncated.

As a result, like in the configuration of the oblique projection optical system illustrated in FIG. 28, not only the lens nearest to the projection screen but also a predetermined number of lenses successively arranged from the position nearest to the projection screen are formed in the shape lacking the area through which the image light flux is not passed. In this way, the oblique projection optical system can be reduced in both size and weight and can be fabricated at a lower cost.

Thus, the use of this oblique projection optical system more preferably makes it possible to fabricate a compact, lightweight and low cost projection type display apparatus.

With the configuration of the oblique projection optical system illustrated in FIG. 28, the size, weight and cost can be reduced for both the projection type display apparatus having the flat mirror as shown in FIGS. 1 to 6 and the projection type display apparatus having no flat mirror as illustrated in FIGS. 7 and 8.

Figure 29:
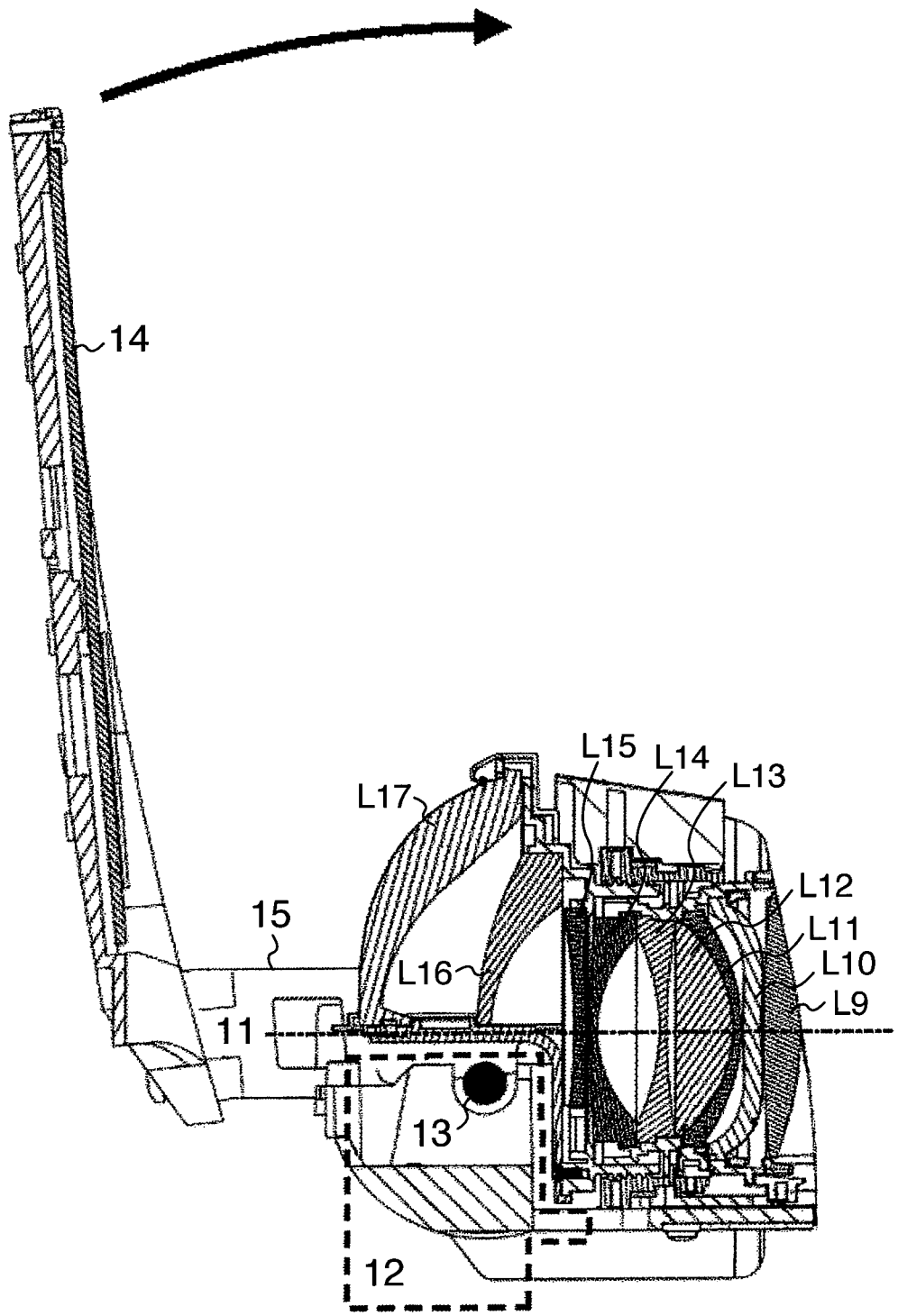
FIG. 29 is a diagram illustrating the configuration of a part of the projection type display apparatus according to an embodiment of the invention.

With reference to FIG. 29, an explanation is given about an example in which the size of the projection type display apparatus having a flat mirror is suitably reduced by utilizing the space 12 of the oblique projection optical system thereof illustrated in FIG. 28.

FIG. 29 illustrates a portion of the oblique projection optical system of the projection type display apparatus having a flat mirror, a flat mirror 14, a mirror holding unit 15 for holding the flat mirror, and a mirror rotation shaft 13 providing a support to rotate the mirror holding unit 15. In the example shown in FIG. 29, the mirror rotation shaft 13 is arranged in a space corresponding to the space 12 shown in FIG. 28. In FIG. 29, the flat mirror is shown at a position for projecting an image, and when the flat mirror is accommodated in the upper part of the set housing, it can be accommodated by rotating the mirror holding unit 15 around the mirror rotation shaft 13 in the illustrated direction.

In the projection type display apparatus having the flat mirror illustrated in FIGS. 1 to 6, the flat mirror is accommodated in the upper part of the set housing by the flat mirror rotation/fixing mechanism 4, the rotation mechanism 5 and the moving mechanism 8 for the mirror fixing frame, the fixing unit 6 and the fixing unit 7. Namely, the position of the flat mirror is changed by the two types of rotational motions and the two types of slide motions.

On the contrary, in the configuration illustrated in FIG. 29, only by the rotational motion around the mirror rotation shaft 13, the angle that the flat mirror forms to the optical axis 11 shared by the largest number of lenses of the oblique projection optical system can be changed thereby to change the operating and accommodation of the positions of the flat mirror. Specifically, in the configuration illustrated in FIG. 29, both the operating and the accommodation positions of the mirror can be changed by a simpler rotation adjusting mechanism including the mirror rotation shaft 13 and the mirror holding unit 15.

Further, in the example illustrated in FIG. 29, the mirror rotation shaft 13 is formed of a single metal shaft to improve the holding accuracy of the mirror rotation shaft 13. If it is supposed that a single mirror rotation shaft formed of metal is attempt to be used in a display apparatus not having the compact structure of the oblique projection optical system as illustrated in FIG. 28, the position of the mirror rotation shaft would interfere with the lenses of the oblique projection optical system unless the position of the mirror rotation shaft is located ahead in the direction of projection or lower than the position corresponding to the space 12 illustrated in FIG. 28. In the example illustrated in FIG. 29, in contrast, the mirror rotation shaft 13, which is arranged in a space corresponding to the space 12 illustrated in FIG. 28, is not required to be arranged at a position ahead in the direction of projection or lower than the position corresponding to the space 12, even if it is formed of a single metal shaft, thereby preventing the set housing from becoming bulky.

Specifically, the configuration illustrated in FIG. 29 can further reduce the size of the projection type display apparatus in a suitable way.

In FIG. 29, the mirror rotation shaft 13 is arranged at a position corresponding to the space 12. FIG. 28 illustrates that the space 12 includes the space formed continuously from the position nearest to the projection screen, at a position not including the optical axis 11 shared by the largest number of lenses of the oblique projection optical system and being inverted symmetrically about the optical axis 11 with respect to the space which is occupied by the plurality of lenses which have such a shape that a portion of the aspheric or spherical shape symmetric about the optical axis is truncated.

Accordingly, if the mirror rotation shaft 13 is arranged at a position superposed on at least a portion of the space inverted symmetrically about the optical axis 11 with respect to the space which is occupied by the plurality of lenses formed continuously from the position nearest to the projection screen at a position not including the optical axis 11 shared by the largest number of lenses of the oblique projection optical system and which have such a shape that a portion of the aspheric or spherical shape symmetric about the optical axis is truncated, then at least the effect similar to that of the configuration shown in FIG. 29 can be obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type display apparatus comprising a group of lenses having a plurality of lenses which enlarges and projects an image of a display device on a projection screen,
   wherein said group of lenses has a first lens arranged at a nearest position to said projection screen,
   wherein a flat mirror which reflects an optical path is arranged between said first lens and said projection screen,
   wherein an effective area of an image light flux which passes through said first lens does not include an optical axis shared by a plurality of lenses which do not include at least said first lens among said group of lenses,
   wherein said flat mirror is arranged at a predetermined angle with respect to said optical axis, and
   the projection type display apparatus further comprising a moving mechanism or moving said flat mirror of the oblique projection optical system along said optical axis.

2. A projection type display apparatus comprising a group of lenses having a plurality of lenses which enlarges and projects an image of a display device on a projection screen,
   wherein said group of lenses has a first lens arranged at a nearest position to said projection screen,
   wherein a flat mirror which reflects an optical path is arranged between said first lens and said projection screen,
   wherein an effective area of an image light flux which passes through said first lens does not include an optical axis shared by a plurality of lenses which do not include at least said first lens among said group of lenses, wherein said flat mirror is arranged at a predetermined angle with respect to said optical axis, wherein an upper end of a vertical effective area of said first lens is located above a lower end of a vertical effective area of said flat mirror, and wherein the apparatus further comprises a moving mechanism or moving said flat mirror of the oblique projection optical system along said optical axis.

3. A projection type display apparatus comprising a group of lenses having a plurality of lenses which enlarges and projects an image of a display device on a projection screen, wherein said group of lenses has a first lens arranged at a nearest position to said projection screen, wherein a flat mirror which reflects an optical path is arranged between said first lens and said projection screen, wherein an effective area of an image light flux which passes through said first lens does not include an optical axis shared by a plurality of lenses which do not include at least said first lens among said group of lenses, wherein said flat mirror is arranged at a predetermined angle with respect to said optical axis, and the projection type display apparatus further comprising:

a rotation adjusting mechanism adapted to change an angle of said flat mirror of said oblique projection optical system with respect to said optical axis;

means for detecting said rotation angle of said flat mirror; and an image correction function for automatically correcting distortion of a projected image in accordance with said detected rotation angle.

4. The projection type display apparatus according to claim 1, comprising:

a rotation adjusting mechanism adapted to change an angle of said flat mirror of said oblique projection optical system with respect to said optical;

means for detecting said rotation angle of said flat mirror; and an image correction function for automatically correcting distortion of a projected image in accordance with said detected rotation angle.

5. A projection type display apparatus comprising a group of lenses having a plurality of lenses which enlarges and projects an image of a display device on a projection screen, wherein said group of lenses has a first lens arranged at a nearest position to said projection screen, wherein a flat mirror which reflects an optical path is arranged between said first lens and said projection screen, wherein an effective area of an image light flux which passes through said first lens does not include an optical axis shared by a plurality of lenses which do not include at least said first lens among said group of lenses, wherein said flat mirror is arranged at a predetermined angle with respect to said optical axis, and wherein an upper end of a vertical effective area of said first lens is located above a lower end of a vertical effective area of said flat mirror, the apparatus further comprising:

a rotation adjusting mechanism adapted to change an angle of said flat mirror of said oblique projection optical system with respect to said optical axis;

means for detecting said rotation angle of said flat mirror; and an image correction function for automatically correcting distortion of a projected image in accordance with said detected rotation angle.

6. A projection type display apparatus comprising a group of lenses having a plurality of lenses which enlarges and projects an image of a display device on a projection screen, wherein said group of lenses has a first lens arranged at a nearest position to said projection screen, wherein a flat mirror which reflects an optical path is arranged between said first lens and said projection screen, wherein an effective area of an image light flux which passes through said first lens does not include an optical axis shared by a plurality of lenses which do not include at least said first lens among said group of lenses, wherein said flat mirror is arranged at a predetermined angle with respect to said optical axis, and wherein in case where said flat mirror is arranged at a predetermined angle $\theta 1$ with respect to said optical axis, an enlarged image obtained by an image light flux reflected by said flat mirror is directed toward a display screen of said display device, said projection type display apparatus is arranged being tilted by $\theta 2$ with respect to a reference flat surface substantially perpendicular to said enlarged image, and said angles $\theta 1$ and $\theta 2$ satisfy a relationship, $$1.5 \leq \theta 2/\theta 1 \leq 2.5.$$

7. A projection type display apparatus comprising a group of lenses having a plurality of lenses which enlarges and projects an image of a display device on a projection screen, wherein said group of lenses has a first lens arranged at a nearest position to said projection screen, wherein a flat mirror which reflects an optical path is arranged between said first lens and said projection screen, wherein an effective area of an image light flux which passes through said first lens does not include an optical axis shared by a plurality of lenses which do not include at least said first lens among said group of lenses, wherein said flat mirror is arranged at a predetermined angle with respect to said optical axis, wherein among said plurality of lenses constituting said oblique projection optical system, a predetermined number of successive lenses from said position nearest to said projection screen are all arranged at positions not including said optical axis, and wherein said predetermined number of said successive lenses have such a shape that a portion of aspheric or spherical shape symmetric about said optical axis is truncated.

8. The projection type display apparatus according to claim 6, wherein among said plurality of lenses constituting said oblique projection optical system, a predetermined number of successive lenses from said position nearest to said projection screen are all arranged at positions not including said optical axis, and wherein said predetermined number of said successive lenses have such a shape that a portion of aspheric or spherical shape symmetric about said optical axis is truncated.

9. A projection type display apparatus comprising a group of lenses having a plurality of lenses which enlarges and projects an image of a display device on a projection screen, wherein said group of lenses has a first lens arranged at a nearest position to said projection screen, wherein a flat mirror which reflects an optical path is arranged between said first lens and said projection screen, wherein an effective area of an image light flux which passes through said first lens does not include an optical axis shared by a plurality of lenses which do not include at least said first lens among said group of lenses, wherein said flat mirror is arranged at a predetermined angle with respect to said optical axis, wherein among said plurality of lenses constituting said oblique projection optical system, a predetermined number of successive lenses from said position nearest to said projection screen are all arranged at positions not including said optical axis, and wherein said predetermined number of said successive lenses have such a shape that a portion of aspheric or spherical shape symmetric about said optical axis is truncated, said projection type display apparatus comprising:

a flat minor arranged between said lens nearest to said projection screen and said projection screen; and a rotation adjusting mechanism adapted to change an angle of said flat mirror with respect to said optical axis;

wherein said rotation adjusting mechanism includes a mirror holding unit for holding said flat mirror, and a mirror rotation shaft providing a center around which said mirror holding unit is rotated, and wherein said mirror rotation shaft is arranged in at least partially superposed relation with a space which is an inversion of a space occupied by said predetermined number of said successive lenses from said position nearest to said projection screen, about said optical axis.

10. The projection type display apparatus according to claim 6, wherein among said plurality of lenses constituting said oblique projection optical system, a predetermined number of successive lenses from said position nearest to said projection screen are all arranged at positions not including said optical axis, and said projection type display apparatus comprising:

a flat mirror arranged between said lens nearest to said projection screen and said projection wherein said predetermined number of said successive lenses have such a shape that a portion of aspheric or spherical shape symmetric about said optical axis is truncated, screen; and a rotation adjusting mechanism adapted to change an angle of said flat mirror with respect to said optical axis;

wherein said rotation adjusting mechanism includes a mirror holding unit for holding said flat mirror, and a mirror rotation shaft providing a center around which said mirror holding unit is rotated, and wherein said mirror rotation shaft is arranged in at least partially superposed relation with a space which is an inversion of a space occupied by said predetermined number of said successive lenses from said position nearest to said projection screen, about said optical axis.

* * * * *